US010348517B2

(12) United States Patent
McNamee et al.

(10) Patent No.: US 10,348,517 B2
(45) Date of Patent: Jul. 9, 2019

(54) SYSTEM AND METHOD FOR ENABLING SERVICE LIFECYCLE BASED POLICY, LICENSING, AND CHARGING IN A NETWORK FUNCTION VIRTUALIZATION ECOSYSTEM

(71) Applicant: OPENET TELECOM LTD., Dublin (IE)

(72) Inventors: Alan McNamee, Dublin (IE); Peter Haraszti, County Dublin (IE); Bart Lehane, Dublin (IE); John Fitzpatrick, Co. Kildare (IE)

(73) Assignee: OPENET TELECOM LTD., Dublin (IE)

( * ) Notice: Subject to any disclaimer, the term of this patent is extended or adjusted under 35 U.S.C. 154(b) by 249 days.

(21) Appl. No.: 15/290,883

(22) Filed: Oct. 11, 2016

(65) Prior Publication Data
US 2017/0104609 A1 Apr. 13, 2017

Related U.S. Application Data

(60) Provisional application No. 62/239,615, filed on Oct. 9, 2015.

(51) Int. Cl.
*H04L 12/46* (2006.01)
*H04W 12/04* (2009.01)
*H04L 12/14* (2006.01)

(52) U.S. Cl.
CPC ...... *H04L 12/4641* (2013.01); *H04L 12/1407* (2013.01); *H04W 12/04* (2013.01)

(58) Field of Classification Search
None
See application file for complete search history.

(56) References Cited

U.S. PATENT DOCUMENTS

| 2015/0109967 A1* | 4/2015 | Hogan | H04M 15/66 370/259 |
| 2016/0170848 A1* | 6/2016 | Yang | G06F 11/2023 714/4.12 |
| 2016/0316390 A1* | 10/2016 | Gopalakrishnan | H04W 4/029 |

OTHER PUBLICATIONS

Aurora Ramos et al., "Specification of the Network Function Framework and T-Nova Marketplace", T-Nova Deliverable D2.42, Network Functions as-a-Service Over Virtualised Infrastructures Grant Agreement No. 619520, Version 1.0, Sep. 30, 2015.

(Continued)

*Primary Examiner* — Saba Tsegaye
(74) *Attorney, Agent, or Firm* — The Marbury Law Group, PLLC

(57) ABSTRACT

Systems and computing devices may be configured to intelligently apply service-level policy, charging, licensing, and authorization controls in a telecommunication system that implements or uses network function virtualization technologies. A server computing device deployed in the telecommunication network may be configured to receive a policy request message relating to a network service lifecycle event from another network component, use the information included in the received policy request message to make a service-level policy decision, generate a trigger definition relating to the network service lifecycle event based on the policy decision, generate a policy response message that includes the trigger definition, and send the generated policy response message to the network component.

16 Claims, 12 Drawing Sheets

(56) References Cited

OTHER PUBLICATIONS

Rachid El Hattachi et al., "NGMN 5G White Paper", NGMN Alliance, 5G Initiative Team, Version 1.0, Feb. 17, 2015.
ETSI, "Network Functions and Virtualisation (NFV); Management and Orchestration", Group Specification ETSI GS NFV-MAN 007, V1.1.1 (Dec. 2014), European Telecommunications Standards Institute 2014.
ETSI, "Network Functions Virtualisation (NFV); Ecosystem; Report on SDN Usage in NFV Architectural Framework", Group Specification ETSI GS NFV-EVE 0075, V1.1.1 (Dec. 2015), European Telecommunications Standards Institute 2015.
European Commission 5G Vision, "The 5G Infrastructure Public Private Partnership: the next generation of communication networks and services", Brochure 2014.
Revenue Management TM Forum "GB989—Impact of SDN/NFV on Charging and Billing R15.5.1, How to Guide", https://www.tmforum.org/resources/standard/gb989-impact-of-sdnnfv-on-charging-and-billing-r15-5-1/, 2016.

* cited by examiner

SYSTEM AND METHOD FOR ENABLING SERVICE LIFECYCLE BASED POLICY, LICENSING, AND CHARGING IN A NETWORK FUNCTION VIRTUALIZATION ECOSYSTEM

RELATED APPLICATIONS

This application claims the benefit of priority to U.S. Provisional Application No. 62/239,615 titled "System and Method for Enabling a Network Function Virtualization Ecosystem" filed on Oct. 9, 2015, the entire contents of which is incorporated herein by reference for all purposes.

BACKGROUND

Wireless and cellular communication technologies have seen dramatic improvements over the past several years. Cellular service providers now offer users a wide array of services, higher usage limits, and attractive subscription plans. Wireless dongles and embedded wireless modem cards allow users to use tablet computers, netbooks and laptops to access wireless Internet protocol (IP) and data services through the cellular networks. Internet-enabled smart phones, tablets and gaming consoles have become essential personal accessories, connecting users to friends, work, leisure activities and entertainment. Users now have more choices and expect to have access to content, data and communications at any time, in any place.

Another recent development within the computing and telecommunications industries has been the proliferation of mobile devices that are capable of performing Internet-of-Things (IoT) or Machine-to-Machine (M2M) communications. Such devices may communicate and interact with other devices to accomplish a variety of tasks, all without any direct involvement of human users or operators. These devices may communicate using wireless or the cellular telephone networks, such as 3G, 4G, LTE and UMTS networks.

As more users utilize more these services, network providers, operators, and component developers must adopt and leverage new and emerging technologies (e.g., fully programmable networks, cloud-based architectures, network function virtualization, the softwarization of hardware, etc.) in order to meet increases in user demand, support the array of new services, and provide users with fast and reliable communications. One such emerging technology is network function virtualization (NFV), which may be used to reduce the deployment and operating costs of the network. An NFV-based system may also leverage virtualization technologies and commercial off-the-shelf programmable hardware (e.g., general-purpose servers, storage, switches, etc.) to decouple software implementations of network functions from proprietary hardware appliances, and to otherwise improve the overall performance and functioning of the telecommunication network.

Intelligently implementing NFV-based technologies in modern telecommunication networks presents a number of design and engineering challenges for network engineers, component developers, and telecommunications equipment manufacturers. As such, new and improved solutions that overcome these challenges to intelligently implement NFV-based technologies in modern telecommunication networks so as to meet anticipated increases in user demands, support the array of new and anticipated services, and provide users with faster and more reliable communications will be beneficial to consumers, component developers, telecommunications equipment manufacturers, and network service providers.

SUMMARY

The various embodiments include methods of applying service-level controls in a telecommunication system that implements network function virtualization (NFV), which may include receiving, in a processor of a server computing device, a policy request message relating to a network service lifecycle event from an orchestrator component that is deployed in the telecommunication system, using the information included in the received policy request message to make a service-level policy decision, generating at least one trigger definition relating to the network service lifecycle event based on the policy decision, generating a policy response message that includes the at least one trigger definition, and sending the generated policy response message to the orchestrator component.

In an embodiment, the method may include generating a unique common service key, in which generating the at least one trigger definition relating to the network service lifecycle event based on the policy decision includes generating the at least one trigger definition to include the unique common service key. In a further embodiment, the common service key may be a hierarchical key that includes a top-level portion and at least one sub-level portion, the value of the top-level portion identifies all virtualized network functions (VNFs) and their associated virtual machines (VMs) that are associated with the network service, the value of the at least one sub-level portion identifies a specific VNF and all of the VMs that are associated with that specific VNF.

In a further embodiment, the method may include receiving a trigger from a virtualized network function. In a further embodiment, the method may include detecting, via an orchestrator processor of the orchestrator component, the network service lifecycle event, generating, via the orchestrator processor, the policy request message in response to detecting the network service lifecycle event, sending the generated policy request message to the server computing device, receiving, in the orchestrator processor, the policy response message from the server computing device in response to sending the generated policy request message, extracting the at least one trigger definition from the received policy response message, and setting a trigger based on the information included in the extracted trigger definition. In a further embodiment, setting the trigger based on the information included in the extracted trigger definition includes setting a local trigger in the orchestrator component. In a further embodiment, setting the trigger based on the information included in the extracted trigger definition includes setting a remote trigger in one or more of an instance of a virtualized network function (VNF) in a virtualized services layer of the telecommunication system, a VNF manger in a management and orchestration (MANO) layer of the telecommunication system, a virtualized infrastructure manager in the MANO layer of the telecommunication system, a software defined networking controller, and a software defined networking resource.

In a further embodiment, using the information included in the received policy request message to make the service-level policy decision further may include querying a licensing system. In a further embodiment, using the information included in the received policy request message to make the service-level policy decision may include determining a first value that identifies costs associated with increasing the network service, determining a second value that identifies costs associated with penalties of breaching a service licensing agreement, and making the service-level policy decision based on a result of comparing the first value to the second value.

In a further embodiment, the method may include receiving a trigger that was generated by a network component in response to the network component loading a procedure that causes a trigger event, using a common service key to determine whether to allow the procedure to perform an operation associated with the trigger event, generating a trigger response message that indicates whether to allow performance of the operation associated with the trigger event, and sending the trigger response message to the network component.

Further embodiments may include a server computing device having a processor configured with processor-executable instructions to perform various operations corresponding to the methods discussed above. For example, a further embodiment may include a server computing device that is deployed in a telecommunication system that implements network function virtualization (NFV), and which includes a processor configured with processor-executable instructions to perform operations including receiving a policy request message relating to a network service lifecycle event from an orchestrator component that is deployed in the telecommunication system, using the information included in the received policy request message to make a service-level policy decision, generating at least one trigger definition relating to the network service lifecycle event based on the policy decision, generating a policy response message that includes the at least one trigger definition, and sending the generated policy response message to the orchestrator component.

In an embodiment, the processor may be configured with processor-executable instructions to perform operations further including generating a unique common service key. In a further embodiment, the processor may be configured with processor-executable instructions to perform operations such that generating the at least one trigger definition relating to the network service lifecycle event based on the policy decision includes generating the at least one trigger definition to include the unique common service key.

In a further embodiment, the processor may be configured with processor-executable instructions to perform operations such that the common service key is a hierarchical key that includes a top-level portion and at least one sub-level portion, the value of the top-level portion identifies all virtualized network functions (VNFs) and their associated virtual machines (VMs) that are associated with the network service, the value of the at least one sub-level portion identifies a specific VNF and all of the VMs that are associated with that specific VNF.

In a further embodiment, the processor may be configured with processor-executable instructions to perform operations further including receiving a trigger from a virtualized network function. In a further embodiment, the processor may be configured with processor-executable instructions to perform operations such that sending the generated policy response message to the orchestrator component causes the orchestrator component to set a remote trigger in one or more of an instance of a virtualized network function (VNF) in a virtualized services layer of the telecommunication system, a VNF manger in a management and orchestration (MANO) layer of the telecommunication system, a virtualized infrastructure manager in the MANO layer of the telecommunication system, a software defined networking controller, and a software defined networking resource. In a further embodiment, the processor may be configured with processor-executable instructions to perform operations further including receiving a trigger that was generated by a network component in response to the network component loading a procedure that causes a trigger event, using a common service key to determine whether to allow the procedure to perform an operation associated with the trigger event, generating a trigger response message that indicates whether to allow performance of the operation associated with the trigger event, and sending the trigger response message to the network component.

Further embodiments may include a non-transitory processor-readable storage medium having stored thereon processor-executable instructions configured to cause a processor to perform various operations corresponding to the method operations discussed above. For example a further embodiment may include non-transitory computer readable storage medium having stored thereon processor-executable software instructions configured to cause a processor to in a server computing device that is deployed in a telecommunication system that implements network function virtualization (NFV) to perform operations including receiving a policy request message relating to a network service lifecycle event from an orchestrator component that is deployed in the telecommunication system, using the information included in the received policy request message to make a service-level policy decision, generating at least one trigger definition relating to the network service lifecycle event based on the policy decision, generating a policy response message that includes the at least one trigger definition, and sending the generated policy response message to the orchestrator component.

In an embodiment, the stored processor-executable software instructions may be configured to cause a processor to perform operations further including generating a unique common service key. In a further embodiment, the stored processor-executable software instructions may be configured to cause a processor to perform operations such that generating the at least one trigger definition relating to the network service lifecycle event based on the policy decision includes generating the at least one trigger definition to include the unique common service key. In a further embodiment, the stored processor-executable software instructions may be configured to cause a processor to perform operations such that the common service key is a hierarchical key that includes a top-level portion and at least one sub-level portion, the value of the top-level portion identifies all virtualized network functions (VNFs) and their associated virtual machines (VMs) that are associated with the network service, and the value of the at least one sub-level portion identifies a specific VNF and all of the VMs that are associated with that specific VNF. In a further embodiment, the stored processor-executable software instructions may be configured to cause a processor to perform operations further including receiving a trigger from a virtualized network function.

In a further embodiment, the stored processor-executable software instructions may be configured to cause a processor to perform operations such that sending the generated policy response message to the orchestrator component causes the orchestrator component to set a remote trigger in one or more of an instance of a virtualized network function (VNF) in a virtualized services layer of the telecommunication system, a VNF manger in a management and orchestration (MANO) layer of the telecommunication system, a virtualized infrastructure manager in the MANO layer of the telecommunication system, a software defined networking controller, and a software defined networking resource.

In a further embodiment, the stored processor-executable software instructions may be configured to cause a processor to perform operations further including receiving a trigger that was generated by a network component in response to the network component loading a procedure that causes a trigger event, using a common service key to determine whether to allow the procedure to perform an operation associated with the trigger event, generating a trigger response message that indicates whether to allow performance of the operation associated with the trigger event, and sending the trigger response message to the network component.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DESCRIPTION

Figure 1:
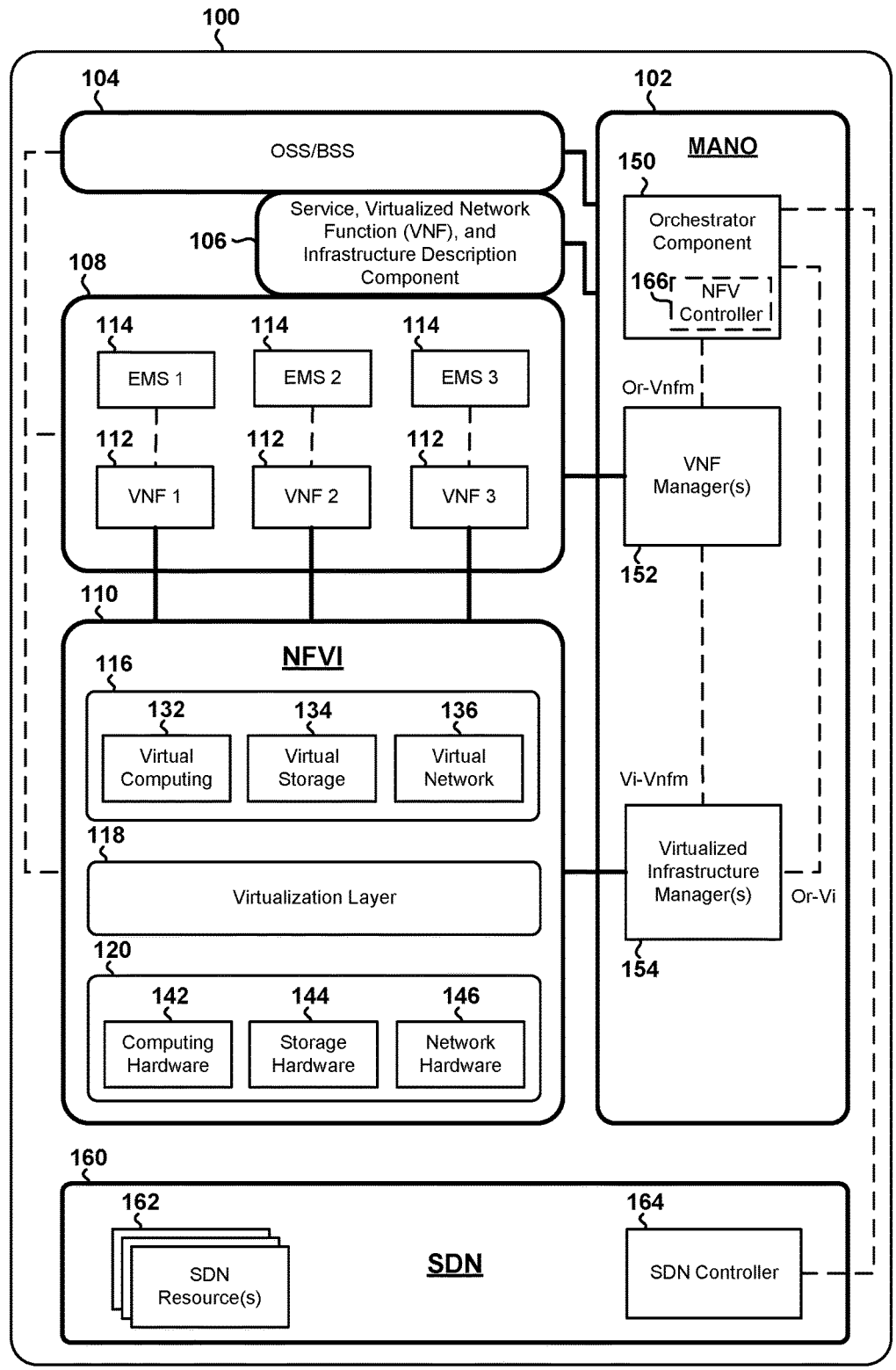
FIG. 1 is a system block diagram illustrating components in a telecommunication system that implements network function virtualization (NFV) and software defined networking (SDN) technologies, and which could be configured to implement various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and components (e.g., server computing devices, etc.) configured to implement the methods, of intelligently applying service-level policy, charging, licensing, and authorization controls in a telecommunication system that implements or uses any or all of software defined networking (SDN), network function virtualization (NFV), NFV Infrastructure (NFVI), and/or virtualized network function (VNF) technologies. The intelligent application of service-level policy, charging, licensing, and authorization controls in these systems improves the overall performance and functionality of the telecommunication system.

In the various embodiments, a charging and license management (CALM) component may be deployed in the telecommunication system, along with new interfaces that allow network components to interact with the CALM component. The CALM component may be hooked into (or configured to receive) information relating to the events that occur in the system/network. The events may include service lifecycle events, virtualized network function (VNF) lifecycle events, infrastructure management events, and software defined networking events.

In some embodiments, the CALM component may be configured to receive a policy request message relating to a network service lifecycle event from a network component (e.g., NFV orchestrator component), and use the information included in the received policy request message to make intelligent service-level policy decisions. Based on these policy decisions, the CALM component may identify, determine or generate trigger definitions (e.g., a message or information structure, etc.) relating to the network service lifecycle event. Each trigger definition may include information that identifies or defines a trigger event that causes the trigger to be fired, a payload or contents of the trigger event (e.g., a common service key, etc.), information that identifies a destination component to which the payload/content is to be sent, and type information (e.g., information indicating whether the trigger is a blocking trigger or non-blocking trigger, etc.).

The CALM component may generate a policy response message that includes the trigger definitions, and send the generated policy response message to the network component (e.g., NFV orchestrator component). The network component may receive the policy response message, and use the trigger definitions to install triggers in one or more network components (e.g., orchestrator, VNFs, etc.).

The network component(s) in which the triggers are installed (e.g., orchestrator, VNFs, etc.) may monitor one or more resources to detect trigger events (e.g., a lifecycle event that causes the trigger to be fired, etc.). Upon detecting a trigger event, a network component may generate and send a trigger to the destination component identified in the trigger definition (e.g., back to the CALM component, etc.). The trigger may be a communication signal or message that includes information suitable for causing a receiving device or component to initiate an action or perform an operation in response to receiving the communication signal/message.

The receiving device (e.g., CALM component) may receive the trigger, and use information obtained from the trigger to make intelligent policy, charging, licensing, and/or authorization decisions. The trigger may also cause the receiving device to perform various operations and/or work in conjunction with other network components (e.g., NFV orchestrator component) to improve the performance, efficiency, and functionality of the system.

In some embodiments, the CALM component may be configured to create and use a common service key. The common service key may include any combination of unique, common or shared keys. The common service key may also be hierarchical in nature. For example, the common service key may include a unique top-level part (e.g., "123") and one or more unique sub-level parts (e.g., 001, 002, 003, etc.) that make up a combined service key (e.g., "123-003" for a particular virtualized network functions (VNFs), etc.). All components (e.g., virtualized network functions (VNFs), physical network functions (PNFs), virtual machines (VMs), software defined networking (SDN) resources, etc.) that form or provide a single service may share a unique top-level part of the key ("123" in the above example). Each component and its associated constituent components (e.g., a VNF component and its associated VMs, etc.) may share a unique sub-level part of the key (e.g., 001, 002, 003, etc.). That is, the unique sub-level part at any layer in the hierarchy may identify a resource and all of its constituent resources. The common service key may be included and used within the VNFs, which allows triggers to come from within VNFs.

Since the CALM component may use the common service key to analyze and correlate received events, the CALM component may receive triggers or lifecycle events from components (e.g., deployed VNF components, VNF manager, SDN controller, etc.) at various different logical layers of the network, including all layers of a management and orchestration (MANO) stack and from individual instances of VNF components. The CALM component may analyze and correlate any or all such information, use the analysis and/or correlation results to make better and more intelligent service-level policy, charging, licensing, and/or authorization decisions.

The terms "mobile device," "wireless device" and "user equipment (UE)" may be used interchangeably in this application and refer to any one of various cellular telephones, smart-phones (e.g., iPhone®), personal data assistants (PDA's), palm-top computers, tablet computers, laptop computers, VoIP phones, wire-line devices, devices implementing Machine-to-Machine (M2M) technologies, devices implementing Internet-of-Things (IoT) technologies, multimedia/Internet enabled cellular telephones, and similar electronic devices capable of sending and receiving wireless communication signals. A wireless device may include a programmable processor and memory. In a preferred embodiment, the wireless device is a cellular handheld device (e.g., a mobile device), which can communicate via a cellular telephone communications network.

The terms "cloud computing," "cloud-based computing," "cloud computing environment," "cloud service provider network," and the like may be used in this application to refer to components (e.g., server computing devices, etc.), networks or systems that provide customers (either internal or external) with a specific type of Internet-based computing that is well known in the art. A cloud computing system typically includes a network server that is implemented within the network infrastructure of a cloud service provider network, and configured to provide consumers with ubiquitous and on-demand access to various services and computing resources.

The terms "cloud radio access network," "cloud RAN," "centralized RAN," and "C-RAN" may be used interchangeably in this application to refer to components, networks, systems, and technologies related to cloud-based radio access networks. A C-RAN system may be used to shift much of the complexity associated with a conventional radio access network (e.g., deploying conventional base stations, etc.) to a centralized location and/or to a cloud environment. In a C-RAN system, each base station includes a low complexity remote radio head and a low cost fiber backhaul. The more complex base station operations, such as baseband processing, are performed via the cloud environment on low cost non-dedicated hardware. As such, C-RAN systems may be used to reduce the costs associated with deploying new base stations. C-RAN systems also have the potential to deliver significant benefits in programmability, reconfiguration and dynamic adaptation of the radio network.

The term "infrastructure as a service (IaaS)" may be used in this application to refer to a component or a system that provides consumers with basic or fundamental computing infrastructure resources (e.g., computing power, memory, network connectivity, disk space, etc.) via a cloud computing environment or over the Internet. An IaaS system may eliminate the need for network operators and/or equipment manufacturers to buy and manage proprietary computing resources or appliances. An IaaS system may rely on virtualization and/or offer computing infrastructure as virtual machines or as virtualized computing resources. Examples of commercially available IaaS systems include Amazon EC2, Azure Services Platform, and HP Cloud.

The term "network as a service (NaaS)" may be used in this application to refer to components or systems that provide consumers with network functionality via a cloud computing environment (or over the Internet). A NaaS system may be similar to the IaaS system discussed above, except instead of computing resources, the NaaS system provides the consumer with network resources, elements and services (e.g., services for network transport connectivity, etc.). By considering network and computing resources as a unified whole, the NaaS system may continuously or periodically re-evaluate resource allocations, and improve the overall performance and/or efficiency of the communication network.

The term "platform as a service (PaaS)" may be used in this application to refer to components, systems, platforms, or computing infrastructures in which software application programs may be developed, generated, built, launched, executed, run, performed, etc. via a cloud computing environment (or over the Internet). A PaaS system may provide operating systems, databases, and web servers as services and/or via the cloud. A PaaS system may include cloud-based computing servers and/or other components that build on the IaaS system discussed above. A PaaS system may allow software developers to develop and run their software solutions via a cloud computing environment. Examples of commercially available PaaS systems include Google App Engine, Windows Azure Cloud Services, Heroku, etc.

The term "software as a service (SaaS)" may be used in this application to refer to components, systems, platforms, or computing infrastructures for hosting software in a cloud computing environment so that it can be accessed remotely by consumers or end users. A SaaS system may eliminate the need to install and run a software application program on a consumer or end user device. Typically, all that is needed is to access the software is a browser or a lightweight app. Examples of commercially available SaaS systems include Google Apps, Salesforce, Microsoft Office 365, etc.

The terms "control plane" may be used in this application to refer to signaling traffic between network components. Control plane data typically does not include the payload or actual user data. Examples of control plane data include information relating to communication setup, security, authentication, charging, enforcement of policy rules, etc.

The term "deep packet inspection (DPI)" may be used in this application to refer to a component or system that is configured to perform traffic analysis operations or provide functionality relating to a specific type of computer network packet examination/filtering. A DPI component (which may be implemented as part of a Traffic Detection Function, in a mobile packet core traffic detection system, etc.) may allow deeper inspection of packet data beyond the typical layer 3 examination of conventional packet inspection. Example DPI operations may include examining the header and data part of a packet as it passes an inspection point, searching for protocol non-compliance or defined criteria, etc. The results of the DPI operations may be used to decide whether the packet may pass through the inspection point and/or whether a packet needs to be routed to a different destination. DPI operations may also be performed for the purpose of collecting statistical information.

The term "application programming interface" and its acronym "API" are used generically in this application to refer to any software interface that may be used by a first component to communicate with a second component. An API may include specifications for routines, procedures, functions, methods, data structures, object classes, and variables. The terms "network application programming interface (API)" and "network API" may be used in this application to refer to components, systems, interfaces, and/or reference points that allow operators (e.g., telecommunications network operators, etc.) to publish or expose network functionality to internal or third party application developers and over-the-top (OTT) service providers. For example, an embodiment system or component may include a network API that is configured to enable or allow an operator to expose various device applications, web applications, and/or network functionalities for use by others.

The terms "programmable radio access" and "programmable radio access network" may be used in this application to refer to networks or technologies that provide the ability to programmatically manage a radio network. Programmable radio access techniques may be used in conjunction with a number of different technologies, including software defined radio (SDR), software defined memory (SDM), C-RAN, etc.

The term "software defined networking (SDN)" may be used in this application to refer to components or systems that enable network programmability by separating the management and control plane from the data plane, providing a programmable interface to network equipment, giving centralized control over network equipment without requiring physical access, etc.

The term "virtual EPC (vEPC)" may be used in this application to refer to network elements of an evolved packet core (EPC) that are "visualized" or operating in a virtualized environment.

The term "network function virtualization (NFV)" may be used in this application to refer to components, systems and technologies that implement (often in new and novel ways) specific aspects of a well-known standard initially set forth by an ETSI industry specifications group in late 2012. The NFV technologies discussed in this application may reduce costs, mitigate vendor reliance and lock-in, reduce the complexities associated with integrating new technologies into existing networks, reduce the complexities associated with deploying new services, etc. NFV technologies discussed in this application may leverage virtualization techniques to enable existing network infrastructure (both user and control plane) to be consolidated and virtualized so that it may operate in a virtualized environment on commodity hardware.

The term "virtualized network function" (VNF) may be used in this application to refer a component, system, or network element that is configured to use virtualization techniques to implement a network function. A VNF may be included and used as part of a network function virtualization (NFV) solution.

The term "NFV Infrastructure (NFVI)" may be used in this application to refer to components, systems, network and/or computing infrastructures on which the network function virtualization (NFV) and/or virtualized network functions (VNFs) may be deployed and used. The NFVI may include physical server computing devices, hypervisors and controllers on which the network operator could deploy, execute, or operate VNFs.

The term "element management system (EMS)" may be used in this application to refer to a component or system that is configured to perform management operations or provide management functionality for one or several virtualized network functions (VNFs). An EMS may be included as part of a "VNF manager" component or implemented separately as an independent component. Whereas VNF manager monitors the VNF lifecycle, the EMS provides more traditional element management functions, such as well-known fault, configuration, accounting, performance, and security (FCAPS) functions.

The term "management and orchestration (MANO)" may be used in this application to refer to a component or system that implements a MANO layer of a network function virtualization (NFV) solution. The MANO layer may be responsible for the system wide management and orchestration of NFV resources. The MANO layer may also be responsible for realizing services on top of the NFV infrastructure (NFVI). In some embodiments, the MANO system or component may include an orchestrator component (e.g., a "NFV orchestrator") that is configured to monitor and maintain a view of all resources and virtualized network functions (VNFs) in the system. The MANO system/component may also include or provide external interfaces for communicating with various other network components and systems in the communication network.

The term "NFV orchestrator" may be used in this application to refer to a component or system that is responsible for managing network function virtualization (NFV) resources. The NFV orchestrator may also be responsible for deploying new virtualized network functions (VNFs) within the network function virtualization infrastructure (NFVI). The NFV orchestrator may be configured to maintain a system wide view of the operations, functions and components. The NFV orchestrator may be configured to control of all VNFs in the NFVI. The NFV orchestrator may also be responsible for on-boarding new services, scaling, performance and policy management, etc. The NFV orchestrator may be included or implemented as part of the MANO system/component.

Various embodiments may include a charging and license management (CALM) component that is deployed in a telecommunication system that implements or uses software defined networking (SDN) technologies and/or network function virtualization (NFV) technologies. The inclusion and use of the CALM component in telecommunication system may improve the performance, efficiency, and functionality of the telecommunication system and its constituent network components.

FIG. 1 illustrates an example telecommunication system 100 that implements a combination of network function virtualization (NFV) technologies and software defined networking (SDN) technologies, and which is suitable for use in implementing the various embodiments. In the example illustrated in FIG. 1, the system 100 includes a management and orchestration (MANO) component 102, an operations support system/business support system (OSS/BSS) component 104, a service, virtualized network function and infrastructure description component 106, a virtualized services component/layer 108, a virtualized infrastructure component/layer 110, and a software defined networking (SDN) component/layer 160.

The MANO component 102 may include an orchestrator component 150, a VNF manager component 152, and a virtualized infrastructure manager (VIM) component 154.

The orchestrator component 150 may be responsible for coordinating the operations and interactions between the different network components and/or the different layers in the system 100 in order to provide an end-to-end service. The orchestrator component 150 may be configured to communicate with any or all of the components in the system 100, including the VNF manager component 152, VIM component 154, SDN controller 164, OSS/BSS component 104, and the description component 106. As an example, the orchestrator component 150 may be configured to receive a service request message, identify network components in the system 100 that are capable of (or required for) fulfilling the service request, and communicate with the identified components to fulfill the service request (e.g., by decomposing and forwarding the service request to the appropriate network component, etc.). In some embodiments, the orchestrator component 150 may include a NFV controller 166.

In some embodiments, the orchestrator component 150 may operate as a single point of integration between the network components and systems in the operator's OSS/BSS environment. In some embodiments, the orchestrator component 150 may be responsible for managing all business rules and other critical information that is received from external systems and/or required for the real-time authorization, service delivery, management of subscribers on the network, etc. In various embodiments, the orchestrator component 150 may include all or portions of an VNF manager component 152, NFV controller 166, VIM component 154, an SDN controller 164, or a combined NFV/SDN controller (not illustrated separately in FIG. 1).

The VIM component 154 may be configured to provide management functionality for the virtualized infrastructure layer 110. For example, the VIM component 154 may be responsible for coordinating and managing the dynamic allocation of the computing infrastructure resources by the virtualized infrastructure layer 110. The VIM component 154 may dynamically expand and contract the resources to meet changing service demands.

The virtualized infrastructure layer 110 may include a virtualized resources layer 116, a virtualization layer 118, and physical resources layer 120. The physical resources layer 120 may include commodity hardware that makes up the physical computing infrastructure, which may include server computing devices, compute nodes, execution hardware, processors, CPUs, input/output devices, persistent storage, memories, etc. In the example illustrated in FIG. 1, the physical computing infrastructure resources in the physical resources layer 120 are organized or grouped into a computing hardware 142 unit, a storage hardware 144 unit, and a network hardware 146 unit.

The virtualization layer 118 of the virtualized infrastructure layer 110 may include components that implement or use virtualization techniques to enable the abstraction (or virtualization) of the commodity hardware or physical computing infrastructure resources (e.g., the resources in the physical resources layer 120). The virtualization layer 118 may use virtualization techniques to "softwarize" the hardware in the physical resources layer 120. The virtualization layer 118 may also abstract the software applications' view of physical computing infrastructure.

In some embodiments, the virtualization layer 118 may be configured to generate or use virtual machines and/or virtual servers. A virtual machine/server may be a software application program that executes another software application program (e.g., an application function, etc.) by emulating physical hardware. A virtual machine/server, along with other virtualization technologies, may allow the physical servers and storage devices in the physical resources layer 120 to be shared by many clients or many different instances of software. The virtual machine/server may also provide an interface between a software application and the underlying physical hardware so as to allow a software application that is tied to a specific instruction set architecture (ISA) to execute on hardware implementing a different ISA. As such, the use of virtual machines/servers may allow a variety of different types of software applications (or network functions, application functions, etc.) to execute on a wide variety of different types of hardware, including a wide variety of commercially available commodity hardware.

The virtualized resources layer 116 of the virtualized infrastructure layer 110 may include virtualized computing infrastructure resources, such as the illustrated virtual computing 132, virtual storage 134, and virtual network 136 components. The virtualized computing infrastructure resources may be virtual machines/servers that "softwarize" the commodity hardware components. Services, software applications, network functions, etc. may execute on top of the virtualized computing infrastructure resources (e.g., virtual computing 132, virtual storage 134, and virtual network 136 components) as if they were executing directly on the physical computing infrastructure (e.g., computing hardware 142 unit, a storage hardware 144 unit, and a network hardware 146 unit).

The VNF manager component 152 may be configured to provide management functionality for the virtualized services layer 108. For example, the VNF manager component 152 may be configured to determine service requirements, determine the network functionality required to implement the service requirements, generate the required virtualized network function (VNF) components 112, and configure/combine the generated virtualized network function (VNF) components 112 so that they collectively provide the required service. The VNF manager component 152 may create and deploy a plurality of VNF components 112 that collectively make up (or account for) the entire end-to-end telecommunications network for a service or a group of services.

The VNF manager component 152 may be application-aware or network-function-aware (i.e., understands the requirements, characteristics and inter-relationships of the applications or network functions it manages). The VNF manager component 152 may intelligently create and/or destroy VNF components 112 (e.g., by consulting a catalog of available network functions such as the virtualized network function and infrastructure description component 106, etc.) to dynamically expand and contract network functionality, commensurate with changing requirements or service demands. The VNF manager component 152 may also be configured to perform operations for on-boarding, scaling, monitoring and configuration of VNFs, etc. In an embodiment, the VNF manager component 152 may be a WEAVER component. In an embodiment, the VNF manager component 152 may be a VNF LIFECYCLE MANAGER.

In some embodiments, the system 100 may include a plurality of VNF manager components 152, such as one VNF manager component 152 for each of the virtualized network function (VNF) components 112. In other embodiments, the system may include a VNF manager component 152 that is responsible for managing many or all of the VNF components 112. In some embodiments, the VNF manager component 152 may include all or portions of the NFV controller 166.

The virtualized services layer 108 may include a plurality of virtualized network function (VNF) components 112 (i.e., VNF1, VNF2, VNF3). Each of the VNF components 112 may be composed of one or more virtual machines, servers or nodes that use the virtualized infrastructure layer 110 in order to implement a specific network function, including any or all of functionality associated with processing and routing data and control signals (e.g., between two UE devices, between an UE device and a service network, between an IoT device and a server, between a communications unit included an automobile and a UE device, etc.). In some embodiments, the VNF components 112 may be dynamic virtual machines that, unlike static virtual machines, have a number of advanced management capabilities and/or more readily support dynamic scaling operations (e.g., scaling up by adding additional instances of a component to the network in response to detecting increased in usage or demand, scaling down to free up resources by destroying instances that are underutilized, etc.).

The VNF components 112 may be virtualized data plane components and/or virtualized control plane components. The VNF components 112 may be virtualized routers, virtualized policy servers, virtualized online charging servers, virtualized offline charging servers, virtualized deep packet inspectors (DPIs), virtualized gateways, etc. As further examples, the VNF components 112 may implement the functionality of a policy and charging enforcement function (PCEF) component, a policy and charging rules function (PCRF) component, online/offline charging systems (OCS/OFCS), mobility management entity (MME), home subscriber server (HSS), subscription profile repository (SPR), unified data repository (UDR), packet control units (PCU), packet data serving nodes (PDSN), radio network controllers (RNC), serving gateway (SGW), packet data network gateway (PGW), or any other network component that participates in, collects information from, or otherwise contributes to, providing a network service. In an embodiment, the VNF components 112 may be configured to collectively provide functionality for the entire end-to-end telecommunications network for a service (e.g., end-to-end service between two UEs, between a UE and service network, etc.).

In some embodiments, the virtualized services layer 108 may also include one or more element management system (EMS) components 114 (i.e., EMS1, EMS2, EMS3). Each of the EMS components 114 may be configured to provide management functionality for one or more of the VNFs components 112. A EMS component 114 may be responsible for more traditional element management functions, such as well-known fault, configuration, accounting, performance, and security (FCAPS) functions. In some embodiments, the EMS components 114 may be included as part of the VNF Manager component 152.

The software defined networking (SDN) component/layer 160 may include one or more SDN resources 162 and at least one SDN controller 164 component. In some embodiments, the SDN resources 162 may be included as part of the network function virtualization (NFV) architecture (e.g., the SDN resources 162 may be VNF components 112, virtual network 136 components, or network hardware 146 units). In some embodiments, the SDN controllers 164 may be included as part of the network function virtualization (NFV) architecture (e.g., the SDN controllers 164 may be VNF components 112, included as part of a virtualized infrastructure manager (VIM) component 154).

The SDN resources 162 and the SDN controller 164 may be included or deployed in a variety of different locations and/or implemented by any of several existing components within the NFV architecture. In the example illustrated in FIG. 1, the SDN resources 162 and the SDN controller 164 are shown explicitly in a separate layer for the sake of clarity. However, nothing in this application should be used to limit the claims to a specific SDN configuration, architecture or organization unless expressly recited as such in the claims.

Figure 2:
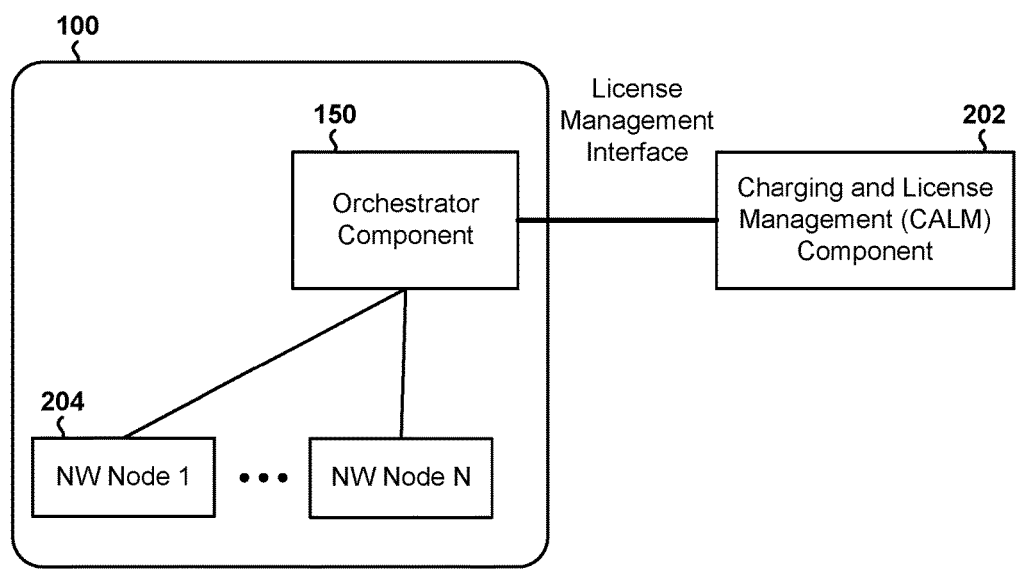
FIG. 2 is a system block diagram illustrating a telecommunication system that includes a licensing server in the form of a charging and license management (CALM) component in accordance with the various embodiments.

FIG. 2 illustrates that the system 100 may be extended to include a licensing server in the form of a charging and license management (CALM) component 202. The CALM component 202 may be configured to collect, analyze and/or correlate data from conventional network components (e.g., HSS, SPR, PCRF, OCS, etc.) and/or from components that are associated with the implementation and use of the SDN/NFV technologies, such as the orchestrator component 150, VNF manager 152, SDN controller 164, NFV controller 166, SDN switch, etc.

The implementation and use of software defined networking (SDN) and network function virtualization (NFV) technologies by the system 100 may allow the CALM component 202 to collect and generate new types of data about the network/system that would not otherwise be readily available to any similarly situated component in the network. The CALM component 202 may also obtain much larger quantities of more granular data related to core network performance than would otherwise be readily available.

Working in conjunction with the other components in the system, the CALM component 202 may use the collected information (or the corresponding analysis/correlation results) to perform various operations that improve the performance and functioning of the telecommunication. Examples of such operations include dynamic scaling operations, modifying the flow of information through the network, intelligently increasing or decreasing capacity, etc.

In conventional telecommunication systems, most network quality of experience (QoE) data is collected at a traffic analysis node/component (e.g., a DPI component, etc.) or at a policy and charging enforcement function (PCEF) component. The use of software defined networking (SDN) technologies allows for SDN switches to be included at different hierarchical levels in the network. This, in turn, allows the CALM component 202 to capture network data at the different hierarchical levels (i.e., by collecting data from the SDN switch), including at levels that are very close to the network edge (e.g., as part of multi-access edge computing (MEC)). The CALM component 202 may use this information to initiate or support various operations and features, such as distributed deep packet inspection (DPI). The CALM component 202 may also use this information to better identify and respond to network bottlenecks and problems.

In some embodiments, SDN switches may be deployed or included at various hierarchical levels in the network/system. The CALM component 202 may be configured to collect network quality of experience (QoE) data from the SDN switches at the various different hierarchical levels. The CALM component 202 may use the collected data to provide, initiate, or support various operations and features that improve the performance and functioning of the network.

In some embodiments, the CALM component 202 may be configured to collect per network node data, such as load information, and use this data to further improve the performance and/or functioning of the network. The CALM component 202 may also obtain additional information from more diverse entities, such as a radio access network (RAN) or content delivery network (CDN), and use this information (e.g., in conjunction with other information collected from nodes in the network) to further improve the performance and functioning of the network.

The analysis and correlation of the collected data (and the results generated via these operations) may enable the CALM component 202 to perform pre-emptive fault detection, quality of experience (QoE) degradation detection, more detailed fault diagnosis operations, and other similar operations. The results of these operations could also be used to enable dynamic and reactive congestion management, such as by spinning up new instances of virtualized functions, redirecting traffic flows, and issuing a pre-apology to subscribers for service degradation. As such, the analysis and correlation of the above-mentioned data sets may enable the CALM component 202 to perform or initiate operations (e.g., dynamic and reactive congestion management) that improve the performance and functioning of the network.

In some embodiments, the highly granular data collected from various levels of the protocol stack, various levels of the management and orchestration (MANO) stack, and across the network could be leveraged by the CALM component 202 to implement a predictive (as opposed to reactive) approach to network modeling. In some embodiments, the CALM component 202 may be configured to use static rules for prediction. In other embodiments, the CALM component 202 may be configured to use machine learning and/or pattern matching techniques for prediction. For example, the CALM component 202 could be configured to identify patterns that lead to increases and/or decreases in network data demand, patterns that cause network degradation or result in poor network utilization, etc. Based on these identified patterns, the CALM component 202 could perform operations that cause the network to adjust and/or reconfigure the NFV or SDN components so as to improve the performance, efficiency and/or functionality of the network/system.

There may be large increases in data requirements in specific areas due to large scale user mobility or an influx of visits to specific news sites (e.g., on the day of a major disaster, etc.) that leads to an increase in the amount of video being streamed. The CALM component 202 may be configured to use the collected information to identify these patterns, predict increases in usage based on the identified patterns, and perform various preemptive or responsive operations that allow the network to better manage the predicted increases in usage. The preemptive/responsive operations may be subscriber based, involve pre-emptive, dropped calls, QoE, congestion management, and information from RAN, devices, core, CDN, etc. In addition, these operations may involve interacting with components, cause pre-apologies and notifications to be sent to subscribers as part of a customer management system, may be subscriber specific, may include sending messages to M2M device owners, etc.

Some embodiments may include an independent SDN controller and an NFV controller. Some embodiments may include a combined SDN and NFV controller (i.e., an "NFV/SDN controller"). In some embodiments, the SDN and NFV controllers (or the combined NFV/SDN controller) may be included as part of the CALM component 202.

The CALM component 202 could be configured to receive (e.g., via the NFV/SDN controller) SDN related triggers and NFV related triggers from various network nodes or components in the system. The SDN related triggers may include: total traffic; traffic per IP flow; traffic per any routing table entry; traffic per application; traffic per application type; time based traffic information (e.g., peak times, rate of traffic during a period window, etc.); and location specific information (as aggregated by the NFV/SDN controller). The NFV related triggers may include: the load on the network components in terms of capacity consumed and available (e.g., CPU, memory, storage, bandwidth, etc.); and available hardware (e.g., capability to create new virtual machines, etc.).

In some embodiments, the CALM component 202 may be configured to receive SDN related triggers from switches (e.g., SDN switches, SDN resources 162). The CALM component 202 could provision counters in various switches (at various levels of the network) so that they can report information on the activities that are detectable at the switch (e.g., total traffic, traffic over a particular IP flow, etc.). In some embodiments, this trigger capability may be extended to include application aware information, such as information that is generated via deep packet inspection (DPI).

In some embodiments, the CALM component 202 may be configured to provide licensing and cost based controls. Some existing network deployments have capacity to support additional subscribers. However, these deployments are often limited by the licensing conditions and number of licenses that the operator purchased. The CALM component 202 may perform real time analysis of network resources and subscriber QoE. Based on this, the components in the system/network could make cost based decisions which trade off the cost of purchasing an additional license or modifying a license in order to increase system capacity with the impact of not increasing capacity and allowing the subscribers QoE to be affected.

Although this could be done in an offline fashion and simply provide analytics to the operator, a more desirable approach is to do it in real time. In this case, the system could dynamically assess the cost based decision and if it is determined that additional resources should be deployed, then a license could be immediately purchased and the system capacity increased. If required, a new virtual machine could be spun up to provide additional system resources (e.g., subscribers getting poor service but too costly to upgrade, dynamic cost management).

Returning to FIG. 2, as described above, the telecommunications system could include a license server in the form of a charging and license management (CALM) component 202. The architecture of this system may be straightforward, with the CALM component 202 including a centralized network function virtualization (NFV) licensing server that collaborates with the orchestrator component 150 (or an NFV controller 166 included as part of the orchestrator component 150) to collect and share statistics on software usage, load information, etc. The orchestrator component 150 may communicate with a plurality of network nodes 204, which may be VNF components 112, VNF managers 152, VIMs 154, etc. In some embodiments, the NFV licensing server or CALM component 202 may be a part of an NFV controller, and vice versa.

The NFV licensing server (or CALM component 202) may contain the following functionality: obtain usage information (e.g., CPU usage, memory usage, number of transactions, number of active virtual machines for a particular node (e.g., a single logical PCRF may consist of 8 load balanced VMs running the PCRF software)) for each network node being monitored from the orchestrator component 150 or NFV controller; translate this usage into a license cost (this can be thought of as a rating function); use license cost information to input into an orchestrator component 150 or NFV controller (e.g., allow/block the creation of new network nodes/components); provide approval for the orchestrator component 150 or NFV controller to create new network nodes/components (a two-phase approach could be used: (1) the NFV license server has pre-approved authorization up to a certain cost or certain licensing terms; and (2) further cost requires real-time approval from a designated employee (e.g., using a portal page, or through some form of notification such as SMS, or application notice)); and report licensing information (e.g., produce a report for a billing style system, obtain real time approval from a designated employee).

The messages exchanged using the license management interface may include the following: requests from the NFV controller to NFV license server to create new network nodes/components (e.g., "Instantiate a new PCRF VM if this is permissible under the license costs"); requests from the NFV controller to NFV license server to create multiple new network nodes/components (e.g., "Instantiate 2 PCRFs, 1 DRA, 1 OCS, and 1 PCEF"); responses from the NFV licensing server to the NFV controller (e.g., indicating approval or denial of a request); and reports from the NFV controller to the NFV license server on actual usage information (e.g., for calculating actual license usage, for optimization of licenses (e.g., offline analysis of license usage), this can be solicited by the NFV license server or unsolicited (e.g., reported once a day), the NFV license server can then perform analysis of the software and map it to the terms of the license in order to optimize it in terms of minimizing cost, maximizing performance.

Figure 3:
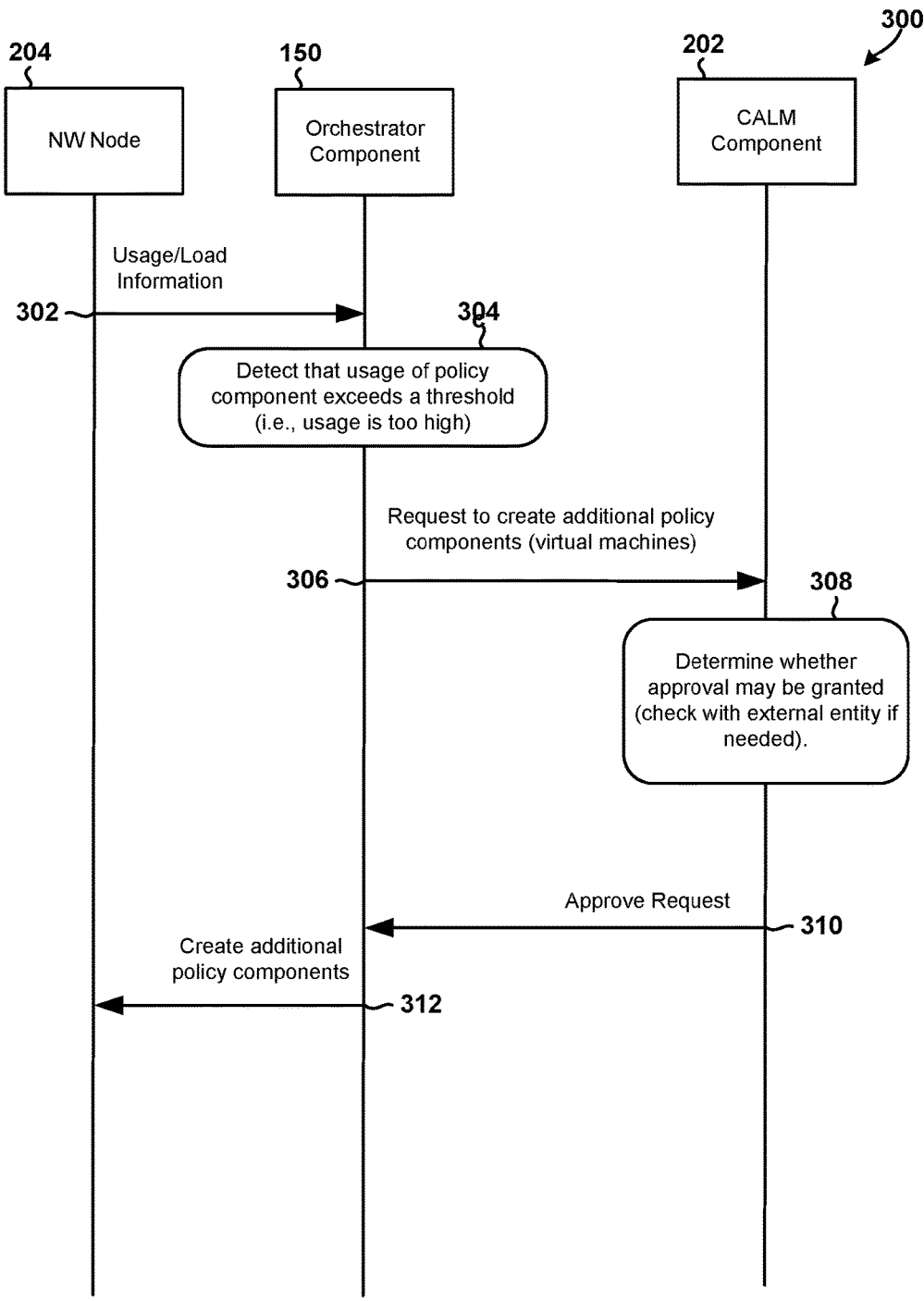
FIG. 3 is a process flow diagram illustrating an embodiment method for adjusting network resources in a telecommunication system that includes a licensing server.

FIG. 3 illustrates a method for adjusting network resources in accordance with an embodiment. In operation 302, one or more network nodes 204 send usage and/or load information to an orchestrator component 150 (NFV controller). In operation block 304, the orchestrator component 150 detects from the network nodes/components that additional capacity is required for the PCRF functionality—this may be due to an increase in CPU load. In operation 306, the orchestrator component 150 sends a request to the CALM component 202 (NFV license server) for approval to spin up two new PCRF VMs. This request includes all details required to calculate the cost (such as current TPS, number of cores, number of VM instances etc). In operation block 308, the CALM component 202 determines if approval can be granted (potentially checking with a balance management system, or by interacting with a person). In operation 310, the CALM component 202 may send a response to the orchestrator component 150 indicating that the request has been approved. In operation 312, the orchestrator component 150 may communicate with the network nodes 204 (e.g., VNF Manager component 152, etc.) to create additional policy nodes.

The various embodiments may manage the cost of automatically scaling virtualized network nodes/components when the creation of the nodes/components is controlled by a central controller. They may also ensure that networks that have private clouds with virtualized software can stay within the limits of their license agreement. This may be achieved by: a virtualization controller that requests licensing information before creating new virtual machines; a system that evaluates software licensing terms based on the current license usage and the requested software usage (e.g., in a mobile environment); and a system that optimizes the usage of licenses for the purposes of minimizing cost and maximizing efficiency.

The various embodiments may provide a link to multi-access edge computing (MEC) systems such as content delivery network (CDN) systems. Device software updates may result in a large amount of demand for the same data at the same time. When the device software is released it is either pushed to the devices, or the devices poll for these updates and begin the download causing large amounts of network congestion. In an effort to mitigate this congestion these updates are often replicated in geographically disparate CDNs. However, this does not reduce the network demand from the mobile network operator's perspective.

NFV and SDN technologies provide the possibility to allow the mobile operator to instantiate new network resources and dedicated network links to specifically deal with increased data demand. This could also include the network dynamically provisioning high capacity data links to the CDN and/or replicating (caching) the update locally on the operators own CDN or as close to the subscribers as possible, perhaps even in the gateway GPRS support nodes (GGSNs) or base stations (e.g., as part of a multi-access edge computing (MEC) deployment, etc.).

Further, the mobile network operator could provision the network to distribute the update in a coordinated manner using SDN and network function virtualization (NFV), e.g., allocating resources in a specific geographic location and making the update available there first, and then dynamically moving network resources as demand decreases in one location and the update is made available in another location.

In other embodiments, the link to the CDN systems may be used to exchange information relating to: subscribers and DPI (video); everybody in a specific location who is watching video; enhance links from RNCs/P-GWs to CDNs; dynamically create end-to-end links; and move CDN clusters (i.e., shutdown a CDN in one location and instantiate it in another location).

Figure 4:
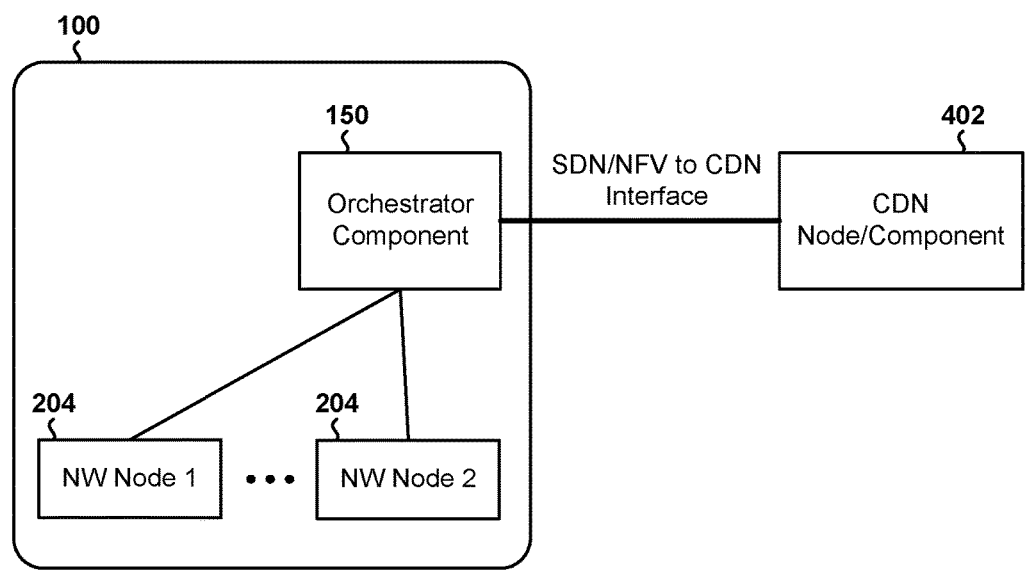
FIG. 4 is a system block diagram illustrating a telecommunication system that includes a content delivery network (CDN) node/component in accordance with the various embodiments.

FIG. 4 illustrates that the system 100 may be extended to provide a link to a content delivery network (CDN) node/component 402, and used to implement various embodiments. In this example, the orchestrator component 150 is configured to communicate with a CDN node/component 402. In some embodiments, the CDN node/component 402 may be included as part of CALM component 202 (illustrated in FIG. 2). In some embodiments, the orchestrator component 150 may include all or portions of a NFV/SDN controller.

The interface between the CDN node/component 402 and the NFV/SDN controller (orchestrator component 150) has a number of purposes. It may enable the CDN node/component 402 to report events to the NFV/SDN controller (e.g., current or impending increase/decrease in traffic, poor QoS (e.g., if the CDN notices that it is getting low throughput on a lot of the content being delivered)). It may enable the NFV/SDN controller to report events to the CDN node/component 402 (e.g., current network load so that the CDN can transmit lower quality video, or hold off on pushing a software update out). It may enable the CDN node/component 402 to request resources from the mobile network (e.g., before commencing bandwidth intensive activity, the CDN Node can request mobile network resources—this can include creating dedicated switches/routers (NFV), or by configuring existing switches/routers by allocating capacity in their routing tables). Such requests should include all necessary information required for an NFV/SDN controller to take action (e.g., IP addresses/ports of the CDN servers (so that SDN rules can be created that update routing tables), any packet marking applied to the data by the CDN network, the protocols used, the amount of data to be transmitted, the time period to transmit data, the location information, and the nature of the data (real-time/non-real-time)).

Figure 5:
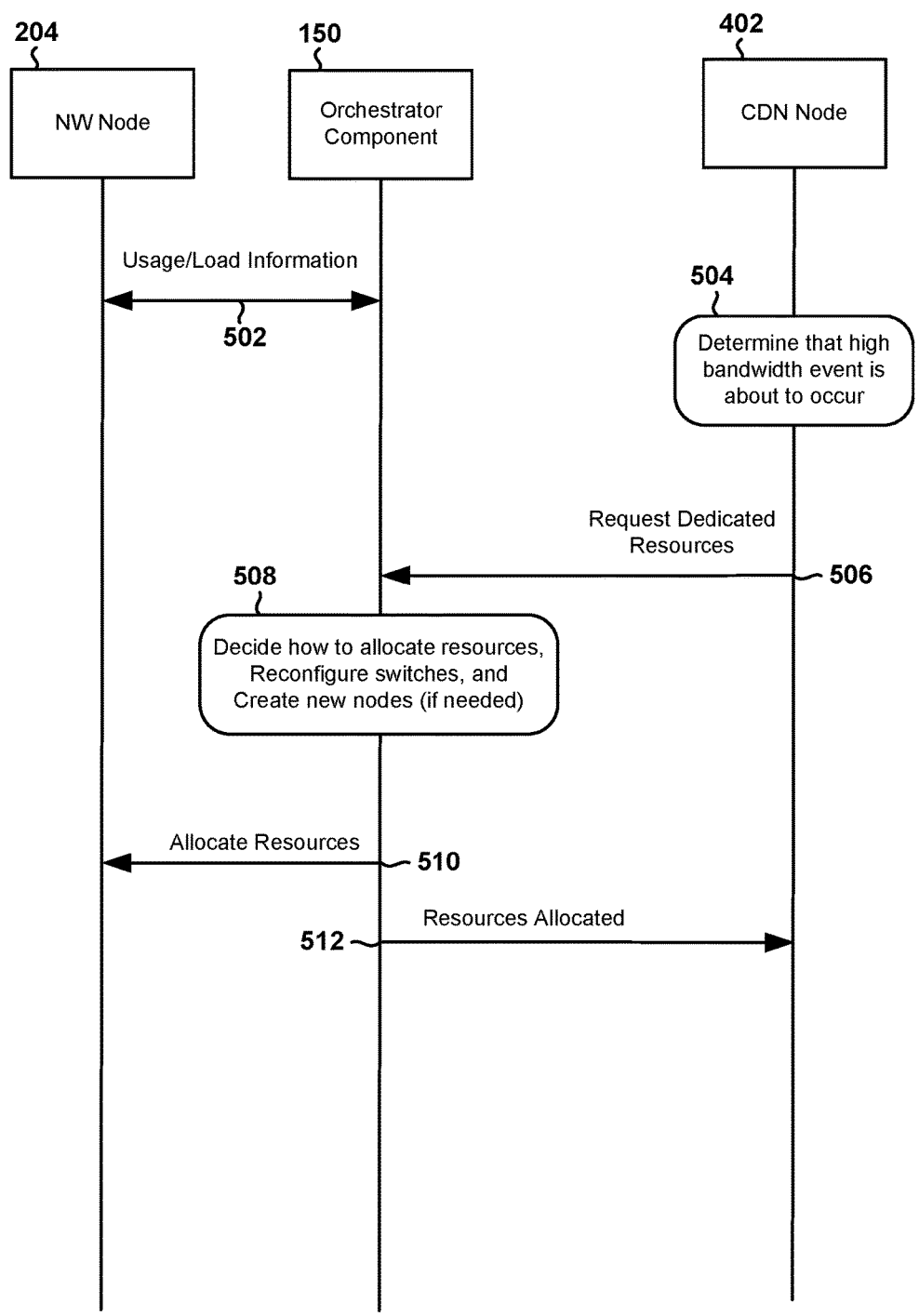
FIG. 5 is a process flow diagram illustrating an embodiment method for adjusting network resources in a telecommunication system that includes a content delivery network (CDN) node/component.

FIG. 5 illustrates a method 500 for adjusting network resources in accordance with another embodiment. In operation 502, one or more network nodes 204 exchange usage and/or load information with an orchestrator component 150 (NFV/SDN controller). In operation block 504, the CDN node/component 402 detects that a high bandwidth event is about to occur. This may be a live streaming event, a software update, or just an increase in traffic due to some high profile event (e.g., a natural disaster or important sporting event). In operation 506, the CDN node/component 402 may request that the network provision dedicated resources for the delivery of this data. The CDN node/component 402 may also pass any necessary information to the orchestrator component 150 so that it can modify the network. In operation block 508, the orchestrator component 150 may determine the best way to treat the traffic. For example, the orchestrator component 150 may determine that it should create dedicated gateways, or reconfigure existing network nodes/components for the delivery of the data from the CDN, etc. The orchestrator component 150 may also actively downgrade traffic from the CDN—as an example, it may take action to rate-limit software updates as they are low-priority updates when compared to somebody watching a live video where real time data is necessary. In operation 510, the orchestrator component 150 may modify the network nodes/components (potentially creating new ones where necessary). In operation 512, the orchestrator component 150 may inform the CDN node/component 402 about the resource allocated (e.g., as a result of operation 510). Traffic may then flow from the CDN through the networks.

The various embodiments may improve the synchronization between the part of the network that is the source of data (the CDN), and the part of the network that delivers the data to end users (the mobile network). Currently, CDNs have little or no knowledge of how capable the network is in delivering the content. Thus, the CDN can request capacity in the mobile network before delivering the content. Furthermore, the system may enable automatic notification of future events that result in the provisioning of networking resources with the purpose of processing the future events, and current network conditions may be reported to modify the delivery of data on that network.

The various embodiments may enable subscriber data to be translated into network rules. This section outlines a general theme of ideas relating to the fact that many products may have access to subscriber level information (stored in SPR, PCRF, OCS, HSS etc.) and/or tailoring the network experience for an individual subscriber (e.g. provide a policy, rating of a subscriber's traffic etc.). This may not be possible in NFV/SDN as any NFV/SDN decision could be made based on a wholesale level. So the embodiments may include components that are configured to take subscriber level information that PCC components have access to, and translate the information into something that can be useful for an NFV/SDN controller. Possible examples include: a PCRF or SPR tracks a group of Internet-of-things (IoT) or machine-to-machine (M2M) devices, and when the number of connected devices in that group exceeds a certain amount, it instantiates a dedicated gateway GPRS support node (GGSN) to handle them; a large number of premium subscribers are currently on line and in danger of getting poor service, and therefore the capacity of the network is increased to handle this using NFV (if the same scenario happens to a large number of regular subscribers the network will not change).

The various embodiments may enable subscriber level aggregation. Typically, policy control decisions and enforcement are based on specific user requirements, restrictions, and active service data flows. As core networks evolve and begin incorporating NFV/SDN capabilities, subscriber requirements, preferences, and classes need to be merged with network resource information in order to make NFV/SDN decisions. However, most NFV/SDN decisions such as redirecting all traffic of a specific class or spinning up a new GGSN to cope with additional IoT or M2M traffic should be made at an aggregate and not per subscriber level. Therefore, subscribers should be segmented into logical groups on which it makes sense to make aggregate decisions.

For example, the system may identify that gold subscribers are going to begin experiencing sub-par network quality, below what their subscription states they should get, due to GGSN congestion. Hence, the system could instantiate a new GGSN and migrate gold subscribers to this new GGSN, while keeping silver and bronze subscribers on the current GGSN. If the same event occurred for bronze subscribers the network would not take the same action.

Another example is that the number of UE nodes/components (e.g., devices implementing M2M or IoT technologies, etc.) assigned to a specific GGSN may not exceed some pre-defined threshold. In the case where this threshold is exceeded, the network may instantiate a dedicated GGSN for these devices (e.g., a dedicated M2M GGSN, IoT GGSN, etc.).

The various embodiments may enable software defined networking (SDN) and network function virtualization (NFV) to operate in response to crowdsourced events. Assume a musical artist is performing in a specific venue but would like to stream the performance to a wider audience. To do so, the following scenario is envisioned: (1) a web site (e.g., the artist's micro site on operator's music store) allows fans to register for the online event and pledge a payment to enable the online event take place; (2) a subscription campaign (e.g., using email, SMS, etc.) will be provided to inform registered fans of the event and to allow fans request their friends to contribute; and (3) a payment threshold is defined such that the online event will only happen if the payment threshold is reached or exceeded.

If the payment threshold is reached the following sequence will be triggered: (1) a micro payment will be deducted from the service accounts of those subscribers who pledged support (the payment may be shared between the operator and artist); (2) the necessary bandwidth will be dynamically provisioned in the core to allow the performance stream from the concert venue to the operator's content delivery network (e.g., by creating a point-to-point virtual connection); (3) only subscribers registered for the online event will be allowed access to the stream and will be granted the necessary QoS needed to for the performance experience; and (4) after the performance has completed, the stream will be ended and bandwidth that was dynamically provisioned for the event will be freed for other use.

The various embodiments may enable software defined networking (SDN) and network function virtualization (NFV) based networks to be subscriber and quality-of-experience (QoE) aware. Examples of data relating to subscribers include historic data (subscriber aware), notifications, QoE/triggers, using subscriber aware info to input into NFV controller, and new video transcoders.

The various embodiments may enable the pre-configuration of device/subscriber attributes for future routing and network performance, because software defined networking (SDN) enables networks to dynamically control the IP level routing that takes place. This is done via a central controller that passes down rules to the routers in the network (e.g. using the OpenFlow protocol). However it is currently difficult to translate the needs of individual subscribers or devices into SDN rules as the SDN rules are done at a wholesale level. This idea allows individual subscribers/devices, or more specifically groups of subscribers/devices, to be taken into account in a network supporting SDN. It is targeted at mobile networks but could be expanded to other networks.

In 3GPP networks, a P-GW may be responsible for IP address allocation. In an embodiment, the P-GW could allocate IP addresses based on a profile that it receives from the PCRF.

Figure 6:
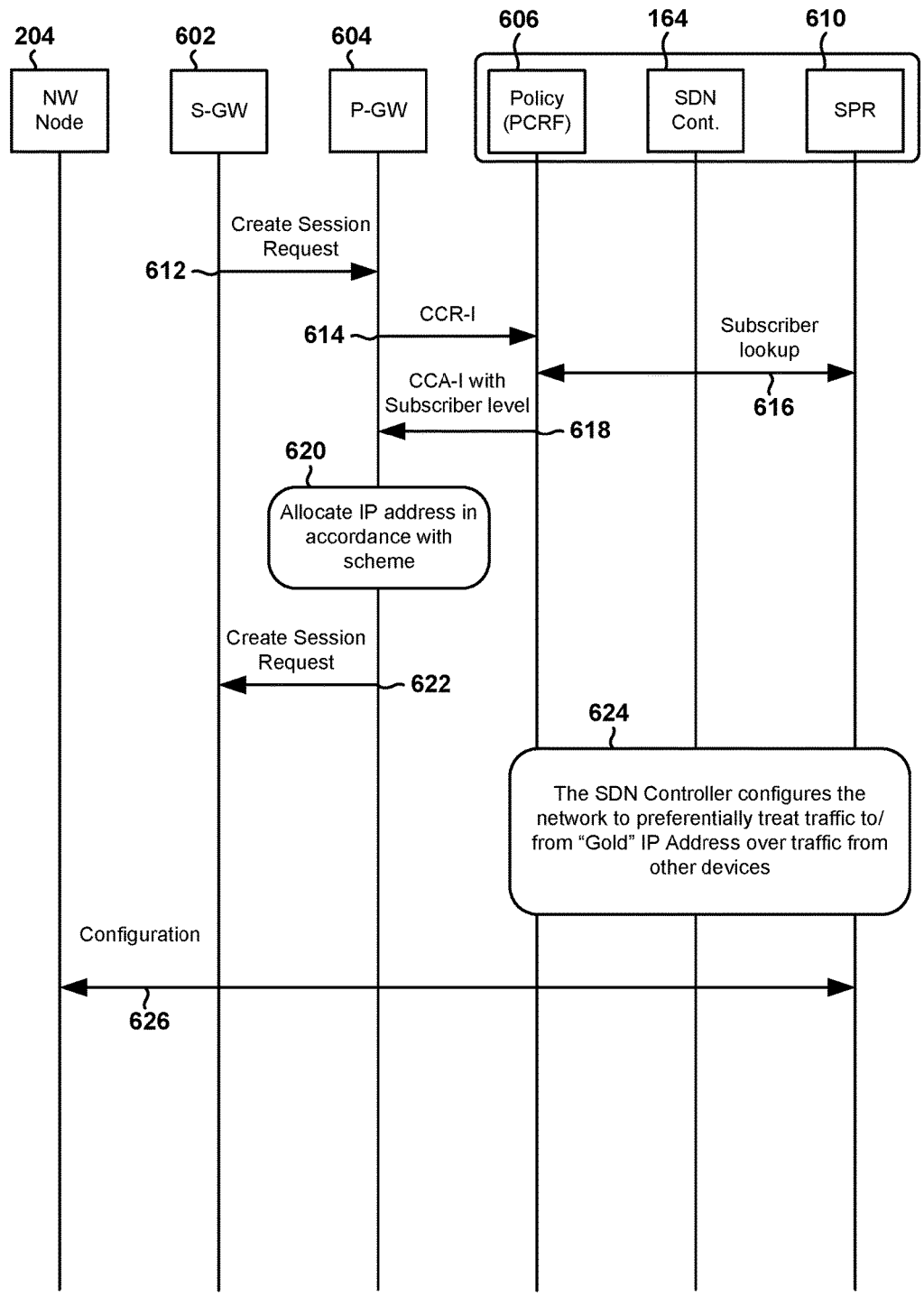
FIG. 6 is a process flow diagram illustrating an embodiment method for reconfiguring network resources.

FIG. 6 illustrates a method for reconfiguring network resources in accordance with an embodiment. In operation 612, the S-GW 602 may send a "Create Session Request" to the P-GW 604. In operation 614, the P-GW may request a policy and subscriber/device information from a policy (e.g., PCRF) component 606. In operation 616, the policy component 606 may obtain subscriber/device information from a SPR 610. In operation 618, the policy component 606 may return/send policy and subscriber/device information to the P-GW 604, along with any other information as part of a Gx CCR/CCA exchange (e.g., if there are three subscriber levels (gold (G), silver (S), and bronze (B)) then the PCRF indicates these levels to the P-GW either using an existing Gx AVP such as a static rule, or with a new Gx AVP, and in another example all M2M devices are given an address from the M2M IP Address range).

In operation block 620, the P-GW 604 may assign IP addresses to match the subscriber/device attributes (e.g., 1.2.3.X=gold subscribers, 1.3.4.X=silver subscribers, and 1.2.5.X=bronze subscribers). In operation 622, the P-GW 604 may send a create session response message to the S-GW 602 so that the session is setup and the subscribers/devices are assigned IP addresses in accordance with their profiles. In operation block 624, the SDN controller 164 is aware of the IP address allocation scheme (either via pre-configuration, or via an update from the PCRF/P-GW). Therefore, in operations 624 and 626, the SDN controller 164 may configure the network to make routing decisions based on subscriber data (e.g., it may route all M2M traffic over certain network nodes/components, ensure that gold subscribers' traffic is preferentially treated). This can be done in a dynamic manner if required (e.g., in response to an event). Examples of the kinds of actions that the SDN controller 164 can perform as a result of this information include: route gold subscribers' traffic through a more efficient path; block or throttle bronze subscribers' traffic (throttling may require additions to OpenFlow); in emergency situations, block all traffic other than emergency services traffic; categorize traffic as M2M traffic and de-prioritize it; route a set of subscribers' traffic or devices' traffic through a video optimization node or DPI; and in times of network failure, block the lower level subscribers'/devices' traffic until the network fully recovers from the failure.

While the embodiments described here are in the context of mobile 3GPP networks, the skilled reader will appreciate that the ideas are equally applicable to other non-3GPP networks including non-mobile networks.

The various embodiments may enable a mechanism of assigning network criterion (e.g., IP addresses) for the purposes of simplifying future network routing and management, and they may allow subscriber level information to be used in low-level (layer 3) routing decisions.

The various embodiments may enable network reporting for network function virtualization (NFV) and SDN control, by collecting information from around the network, perform streaming analytics on this data in real-time, and feeding the results to an orchestrator.

The various embodiments include components (e.g., CALM component, etc.) that are configured to understand the current network state and to manage the network based on the current network state. In the programmable network, it will not be the controller's command set/API that dictates how efficiently the network is run, but rather the controller's access to timely and relevant information that delivers the real value. The systems described in this application may deliver this intelligence, and can underpin the controllers and orchestrators in the programmable network. This allows network decisions to become informed network decisions.

Further, as discussed above with reference to FIG. 1, the network function virtualization (NFV) architecture proposes a layered approach to managing systems. Each vendor could create their own VNF manager (e.g., VNF manager component 152), which would pass information to a higher level orchestrator (e.g., Orchestrator component 15). For this orchestrator to act in the optimal manner, it should have access to real-time data from all parts of the network. The more relevant and timely this information the better. The NFV layer may define standard information to be passed between the VNF managers and the orchestrator, but this data does not necessarily include things like: subscriber information, application information, information about non-VNF nodes/components, external information, etc. The purpose of the system proposed here is to ingest and understand all of this data, process/analyze it, and then pass only relevant information to the orchestrator. One example of this would be a prediction of the time of a future network fault or of a surge in demand.

Figure 7:
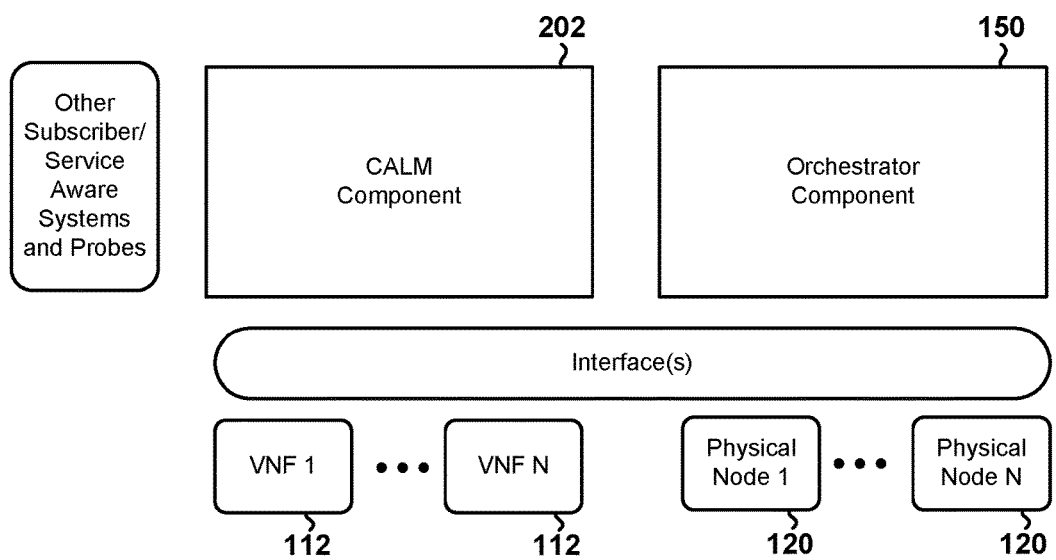
FIG. 7 is a system block diagram illustrating components in a telecommunication system that includes a CALM component and an orchestrator component in accordance with an embodiment.

FIG. 7 illustrates an orchestration and management layer suitable for use with the various embodiments. The CALM component and/or components included within the network (e.g., "Real Time Subscriber And Service Network Monitoring" nodes) may collect information from internal and external nodes/components and reports this information to the orchestrator component 150. Internal network nodes/components would include all of the running VNFs and/or physical nodes/components (e.g., DPIs, P-GWs, routers, RAN probes, MMEs, and IT systems). Examples of external nodes/components could be a weather system (e.g., to report a hurricane warning near a data centre), or a system performing sentiment analysis from a Twitter feed.

The CALM component 202 may collect SDN/NFV related information, OAM data, SNMP data, or any other metadata from a network node. A number of components may sit on top of the CALM component 202 including: a profile manager, a visualization engine, and an analytics engine. The profile manager may be configured to insert subscriber information about the data obtained (e.g., to understand what kind of subscribers are currently on a specific APN, or on a specific part of the network that is congested), while the visualization engine may display data that is obtained. The analytics engine may be configured to perform streaming analytics on the data that comes in from the CALM component 202, and send outputs to the orchestrator component 150 when necessary.

In an embodiment, the system may perform the following functions: predicting a network fault and passing this information to the orchestrator; predicting a surge in demand and passing this information to the orchestrator so that it can take preventative measures (e.g., create new video optimization VNFs and route traffic to them); predicting where demand is likely to spike; notifying the orchestrator of a potential weather-related outage so that it can take preventative measures; informing the orchestrator that a certain subscriber group (e.g., business subscribers) are not being allocated sufficient resources; informing the orchestrator that specific applications are taking up to much resources (or are receiving too little bandwidth); allowing the network to become more efficient as the network resources can be used in an optimal way; and used to prevent faults before they occur, therefore improving customer experience. Note that outputting this information to an orchestrator is only one possible output of the system. The output could be a notification to a human or some other network node.

In some embodiments, the NFV enablement platform may implement a "MANO as a service" or MaaS functionality so as to provide operators with the ability to process towards "Full NFV" or full virtualization in a well-defined and self-controlled fashion. In some embodiments, the NFV enablement platform may implement and use IaaS technologies. In some embodiments, the NFV enablement platform may implement and use PaaS technologies.

MANO as a service or "MaaS" may allow multiple vendors to share the same common management layer. This provides a straightforward migration path for vendors who have existing VNFs into an NFV deployment. A Network Function MaaS may be driven by a rich set of templates, reducing the entropy associated with an expanding VNF ecosystem. It may also present a low barrier to porting existing VNFs into the VNF ecosystem.

The next concept in the evolution enabled by the NFV enablement platform is the PaaS (Platform as a service) feature. Driven by SDKs, it enables VNF developers to build telco grade virtualized applications easily by abstracting many of the complexities through API driven SDKs. Note the co-existence of Network Functions MaaS and Network Functions PaaS in a deployment is fully supported.

The Platform as a Service model allows developers to rapidly create telco grade network functions in a uniform fashion for deployments into operator deployments. The embodiment component may allow a developer to focus on application specific functionality, as many of the non-functional components will be provided by a "husk." The husk may be a component (or virtual machine, VNF, etc.) that is configured to provide the following capabilities to the VNF developer: abstraction of persistence and data/state storage; operational abstraction; operating system abstraction; auto-scaling; high availability, reliability and auto-healing; centralized monitoring/management of resources; and abstracted load-balancing and routing.

In some aspects, the embodiments described above may be combined with, implemented in, used as part of, used in conjunction with, and/or benefit from components and system that include a service aware security manager for future networks.

The system and methods of the various embodiments may enable SDN and NFV to create new possibilities in terms of generating data about the network and using that data to modify the network. The various embodiments may provide opportunities to obtain much larger quantities of more granular data related to core network performance. The various embodiments may provide licensing and cost based controls. The various embodiments may provide a link to content delivery network (CDN) systems. The various embodiments may enable subscriber data to be translated into network rules. The various embodiments may enable subscriber level aggregation. The various embodiments may enable SDN and NFV to operate in response to crowd-sourced events. The various embodiments may enable SDN and NFV based networks to be subscriber and quality-of-experience (QoE) aware. The various embodiments may enable the pre-configuration of device/subscriber attributes for future routing and network performance. The various embodiments may enable NFV/SDN orchestration. The various embodiments may enable network reporting for NFV and SDN control.

Figure 8:
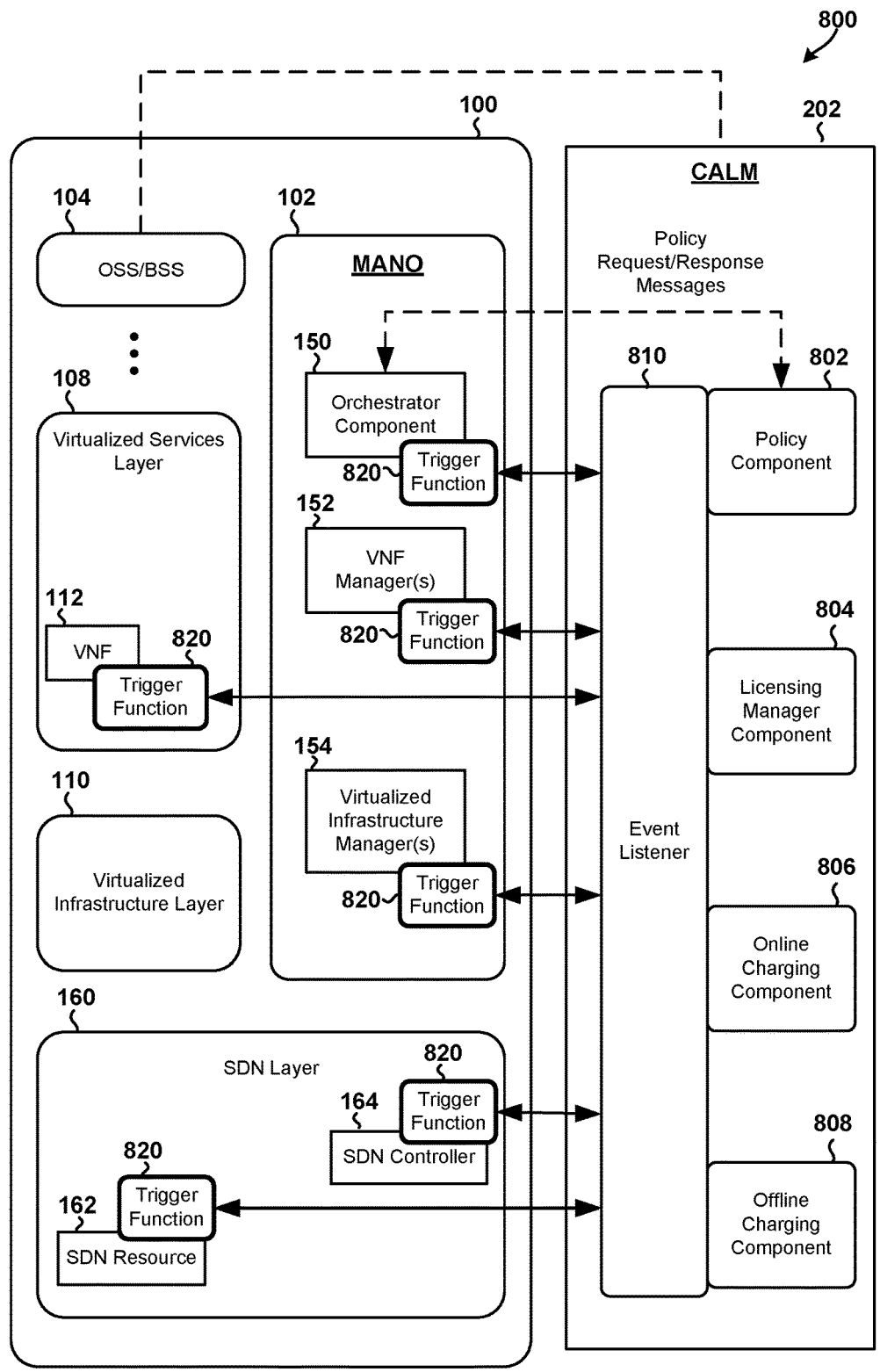
FIG. 8 is a system block diagram illustrating components in a telecommunication system that implements NFV/SDN technologies and includes a CALM component configured to intelligently apply service-level policy, charging, licensing, and authorization controls in accordance with the various embodiments.

FIG. 8 illustrates an example telecommunication system 800 that includes charging and license management (CALM) component 202 that could be configured to intelligently apply service-level policy, charging, licensing, and authorization controls in accordance with the various embodiments. As described above with reference to FIGS. 1 and 2, the VNF/SDN based system 100 may include a management and orchestration (MANO) component 102, an operations support system/business support system (OSS/BSS) component 104, a virtualized services component/layer 108, a virtualized infrastructure component/layer 110, and a SDN component/layer 160. The MANO component 102 may include an orchestrator component 150, a VNF manager component 152, and a virtualized infrastructure manager (VIM) component 154.

In example illustrated in FIG. 8, the CALM component 202 includes a policy component 802, a licensing manager component 804, an online charging component 806, and an offline charging component 808. Each of the CALM-based components 802-808 may be implemented within the CALM component 202 as separate or independent microservices. In addition, any or all of these CALM-based components (i.e., components 802-808) may be implemented as part of other services or components (e.g., OSS/BSS component 104, etc.) and/or as independent stand-alone components. In some embodiments, the online charging component 806 and the offline charging component 808 may be combined into a single charging component. In some embodiments, the licensing manager component 804 may be a local licensing manager (LLM) component that is included in the CALM component 202 and configured to communicate with another licensing manager component included in another component (e.g., in the OSS/BSS component 104, etc.). The CALM component 202 could be deployed and used by a network operator to improve the performance and functioning of the network. The CALM component 202 could also be deployed, managed and used by a "VNF broker." A VNF broker may be an entity (e.g., an independent third party, etc.) that provides VNFs from multiple VNF vendors to one or more network operators as the VNFs are required.

In some embodiments, the CALM component 202 may also include an event listener component that is configured to receive triggers and event information from various trigger functions 820 set or activated throughout the system 100. As such, the CALM component 202 may be hooked into (or configured to receive) information relating to lifecycle events from the orchestrator component 150. The CALM component 202 may be configured to receive information relating to VNF lifecycle events from the VNF components 112 and/or the VNF manager component 152. The CALM component 202 may be configured to receive information relating to infrastructure management events from the VIM component 154. The CALM component 202 may be configured to receive information relating to SDN events from the SDN layer components (e.g., the SDN controller 164, SDN resource 162, etc.).

The CALM component 202 may be configured to receive a policy request message relating to a network service lifecycle event from the orchestrator component 150, and use the information included in the received policy request message to make intelligent service-level policy decisions. Based on these policy decisions, the CALM component 202 may identify, determine or generate trigger definitions relating to the network service lifecycle event. Each trigger definition may include information that identifies or defines a trigger event that causes the trigger to be fired, a payload or contents of the trigger event (e.g., a common service key having a unique top-level part and a unique sub-level part, etc.), information that identifies a destination component (e.g., to the event listener 810, CALM-based components 802-808, etc.) to which the payload/content is to be sent, and type information (e.g., information indicating whether the trigger is a blocking trigger or non-blocking trigger, etc.).

The CALM component 202 may generate a policy response message that includes the trigger definitions, and send the generated policy response message to the orchestrator component 150. The orchestrator component 150 may receive the policy response message, and use the trigger definitions to install triggers or activate trigger functions in one or more network components. For example, the orchestrator component 150 may communicate with the other network components/functions in the system 100 to activate or set trigger functions in a VNF component 112, SDN resource component 162, SDN controller 164, VIM component 154, and/or VNF manager component 152.

Each of network component(s) in which the triggers are installed (or which have activated trigger functions) may monitor one or more resources to detect trigger events (e.g., an event that causes the trigger to be fired, etc.). Upon detecting a triggered event, the network component may generate and send a trigger to the destination component (e.g., to the event listener 810, CALM-based components 802-808, etc.) identified in the trigger definition. The trigger may be a communication signal or message that includes information suitable for causing a receiving device or component to initiate an action or perform an operation in response to receiving the communication signal/message.

In the example illustrated in FIG. 8, the destination component is included in the CALM component 202. As such, the trigger is detected by event listener 810, which routes the trigger to the appropriate CALM-based component 802-808. However, if the trigger definition identified the component OCS 806 as the destination component and the OCS component 806 were included in the OSS/BSS 104, then the trigger would either be sent directly to the OSS/BSS 104 or else to the event listener 810 and then to the OSS/BSS 104 (but not to the CALM component 806). The receiving component (e.g., CALM component in FIG. 8) may receive the trigger, and use information obtained from the trigger to make intelligent policy, charging, licensing, and/or authorization decisions.

In some embodiments, the CALM component 202 may be configured to create and use a common service key. The common service key may include any combination of unique, common or shared keys. The common service key may be hierarchical in nature such that all components that form a single service (e.g., VoLTE for a thousand subscribers, IoT-based vehicle tracking for a single automobile manufacture, videoconferencing for 300 usage-hours per month, etc.) share a unique top-level part (or common part) of the key, and each component and its associated constituent components share a unique sub-level part of the key. The common service key may be included and used within the VNFs. The inclusion and use of common service keys within the VNF allows triggers to come from within the VNFs. This improves performance and functionally of the telecommunication system.

Since the CALM component 202 may use the common service key to analyze and correlate received events, the CALM component 202 may receive triggers or lifecycle events from components (e.g., deployed VNF components, VNF manager, SDN controller, etc.) at various different logical layers of the network 100. The CALM component 202 may analyze and correlate any or all such information, use the analysis and/or correlation results to make intelligent service-level policy, charging, licensing, and/or authorization decisions.

In some embodiments, the CALM component 202 may be configured to determine various costs and/or allow for the real-time display of costs, including costs for: (1) the entire NFV environment; (2) individual end-to-end services—in terms of costs and receipts; (3) VNFs—because a single type of VNF may be used in multiple services; and (4) VNF providers—because a single provider may provide multiple VNFs. In an embodiment, the CALM component 202 may be configured to provide the real-time display of costs via a web-based graphical user interface.

The CALM component 202 may provide an enhanced and more fine-grained service management from a policy, charging, licensing, and authorization perspective. The CALM component 202 may be configured to receive and act on service lifecycle events, and use the service lifecycle events along with information obtained from other components in the network (e.g., VNF vendor information, subscriber information, customer information, operator rules, etc.) to make intelligent network management decisions.

Figure 9:
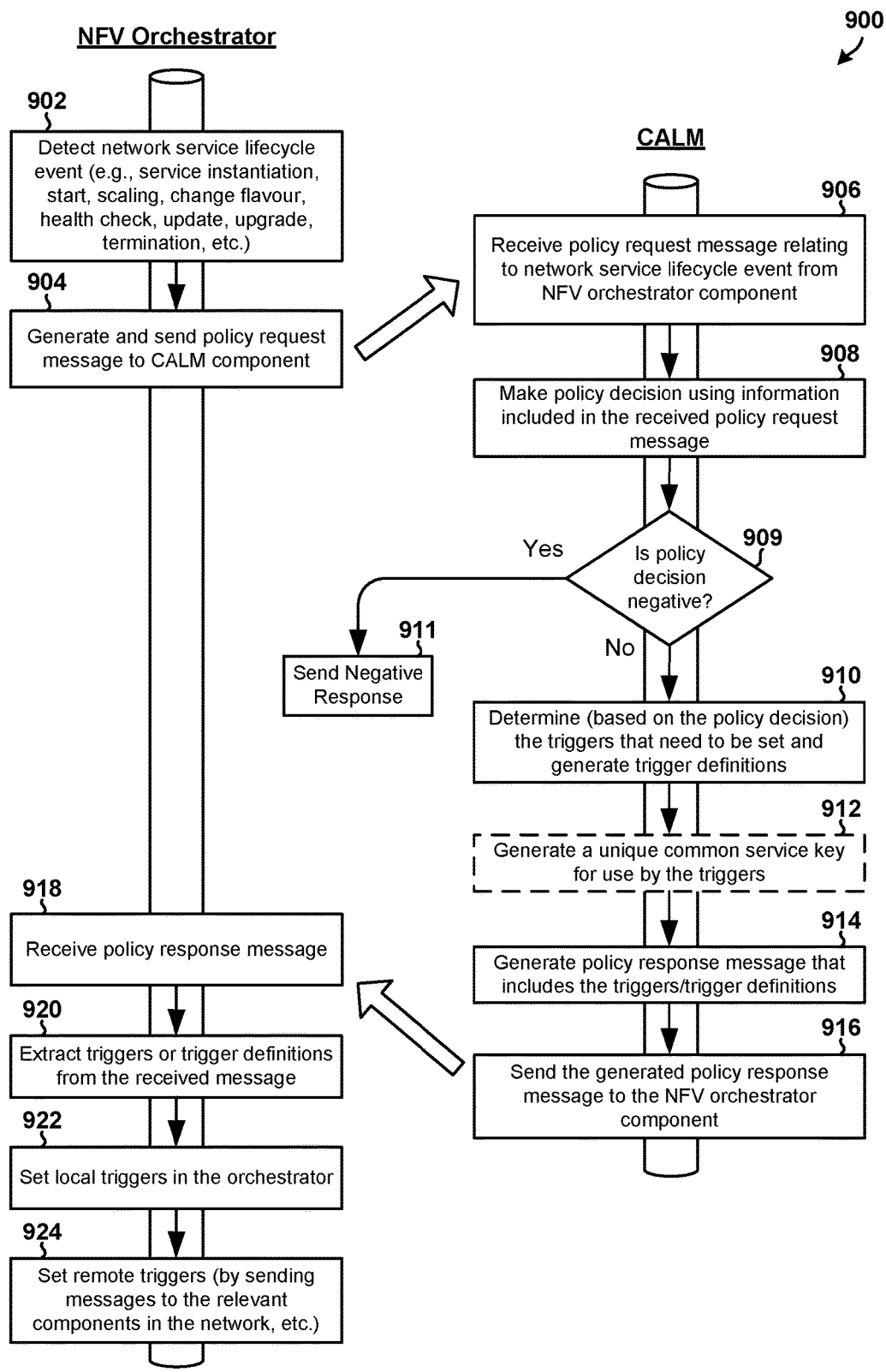
FIGS. 9 through 11 are process flow diagrams illustrating a method of applying service-level controls in a telecommunication system in accordance an embodiment.
Figure 10:
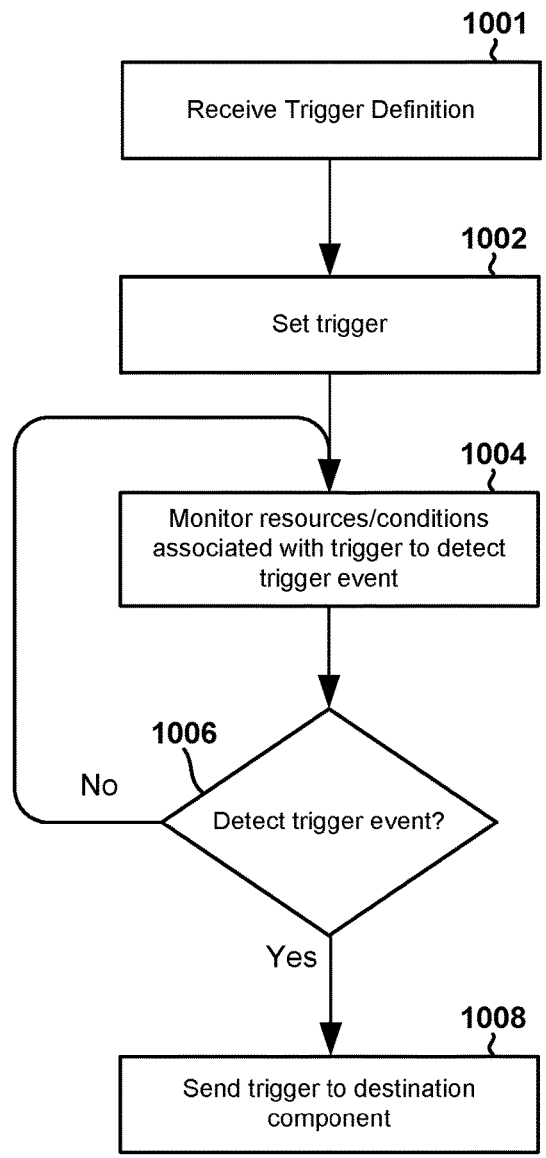

FIGS. 9 and 10 illustrate a method 900 for applying service-level controls in a telecommunication system in accordance with an embodiment. Method 900 may be performed in a system (e.g., telecommunication system 800 illustrated in FIG. 8) that includes server computing devices that implement all or portions of a CALM component and an NFV orchestrator component 150.

In block 902, a processor in a NFV orchestrator component (or NFV orchestrator processor) may detect a service lifecycle event. This may be as a result of generating the lifecycle event in response to either an external stimulus (e.g., from the OSS/BSS 104) or an internal event within the management and orchestration (MANO) component 102 (e.g., a VNF lifecycle event, infrastructure management event, and/or a software defined networking event). Examples of network service lifecycles events that could be detected in block 902 include a definition event, service instantiation event (e.g., instantiating a new network slice, etc.) service start event, a scaling-up event, scaling-down event, scaling-in event, scaling-out event, a change of flavor event (e.g., changing capacity from "large" to "medium," etc.), a health check event, an update event, an upgrade event, a termination event, etc. In block 904, the NFV orchestrator processor may generate and send a policy request message to the CALM component in response to detecting the event.

In block 906, a processor in the CALM component (or CALM processor) may receive a policy request message relating to the detected service lifecycle event from the NFV orchestrator component. In block 908, the CALM processor may use the information included in the received policy request message (e.g., network service policy event information, etc.) to make a policy decision.

As part of the policy decision operations in block 908, the CALM processor may determine whether there are any existing policies that relate to the network's resources, determine whether existing policies are being satisfied, identify resources or components for implementing a policy, determine whether there are licenses associated with the use of resources or constituent components (e.g., VNF components, etc.), determine whether the licenses are compatible (e.g., do both public licenses commercial licenses authorize their respective products to be used with one another, etc.), whether the policy decision relates to online charging, whether the policy decision relates to offline charging, etc.

As mentioned above, in block 908, the CALM processor may determine whether there are licenses associated with the use of resources or constituent components. For example, the CALM processor may determine that a first VNF component and a second VNF component could be used to implement a policy or provide a service identified in the received policy request message. The CALM processor may determine that there is a first license (Lic1) associated with the use of the first VNF component and/or that there is a second license (Lic 2) associated with the use of second VNF component. Each of the first and second licenses (Lic 1 and Lic 2) may include a variety of different license parameters. The CALM processor may evaluate or compare these license parameters to determine whether the first and second VNF components are incompatible. This may include determining whether the first license (Lic1) is incompatible with second license (Lic2). This may also include determining whether the first license (Lic1) is incompatible with the second VNF component.

For instance, the first license (Lic1) could explicitly state (e.g., via the value of one of its license parameters, etc.) that its associated VNF (i.e., the first VNF component) is not to be used as part of any service that uses a VNF component that is provided by a specific competitor (or a vendor that is included in a list of prohibited vendors, etc.). The CALM processor could determine that the licenses (e.g., Lic1 and Lic 2) are incompatible if the second VNF is provided by the identified competitor or vendor, and/or based on determining that the second license (Lic2) requires that its associated VNF (second VNF) only be used with a product that is only available through that competitor.

As another example, the first license (Lic1) could explicitly state (via a license parameter, etc.) that its associated VNF (i.e., the first VNF component) can only be used as part of a service if all of the other VNFs used for that service are open source (e.g., source code is made freely available for modification or redistribution, etc.). In this example, the CALM processor may determine that first and second licenses (Lic 1 and Lic 2) are not compatible in block 908 if the second license (Lic2) is a commercial license that expressly forbids the release of its associated VNF's (second VNF's) source code.

In some embodiments, in block 908, the CALM processor may make policy decisions (e.g., to create or destroy select instances of VNF components, etc.) based on quotas, funds, credits, access units, or unit allowances. An access unit may be an information unit that identifies a quantity or amount of services that are to be provided to a customer (e.g., telco operator). A unit allowance may be an amount of access unit that is allocated to the consumer, which may be used in some embodiments to determine to whether to provide services to that consumer. The CALM processor may access, query or receive information that identifies the amount of access units available in a balance account (e.g., from a balance management component, OSS/BSS, etc.) or remaining unit allowances, and make the policy decision in block 908 based on the amount of access units or unit allowances.

In an embodiment, the CALM processor may check an online balance in the online charging component in order to determine the amount of unit allowances available. For example, a consumer (e.g., teleco operator) may have an allowance of 300 hours of service usage per month. The CALM processor may check the online balance system to determine whether all of the allocated unit allowances associated with that customer been consumed (i.e., exceed 300 hours of service usage in the current month). The CALM processor may make a policy decision to allow the service to proceed in response to determining that a sufficient amount of the allocated unit allowances are still available for consumption.

The CALM processor may also determine that the policy decision relates to online charging in block 908. In response, the CALM processor may determine that the relevant online charging rule or policy requires that the associated service only proceed if there are sufficient funds/credits available in the associated balance account and/or if the appropriate amount of funds/credits has been decremented from that balance account. The CALM processor may make a policy decision to allow the service to proceed in response to determining that there are sufficient funds/credits available in the associated balance account and/or that the appropriate amount of funds/credits has been decremented from the account.

In some embodiments, the CALM component may make policy decisions relating to resources and/or any of the components in any of the layers discussed above with reference to FIGS. 1 and 8, including the virtualized services layer 108, MANO component 102, virtualized infrastructure layer 110, and SDN layer 160.

In some embodiments, the CALM component may make policy decisions relating to resources/components in the virtualized services layer 108. For example, the operator (customer) may only have four licenses for operating a PCRF VNF component, and all four licenses may be in use. If the service lifecycle event relates to creating an IoT network slice for connected cars, then the CALM processor may make a policy decision to not to allow a fifth PCRF VNF to be instantiated in block 908.

In some embodiments, the CALM component may make policy decisions relating to resources/components in the virtualized infrastructure layer 110. For example, a policy may prevent scaling because the service is provided for free. Yet, the CALM component may determine that there is a cost associated with the underlying physical resources layer 120 for providing that service, and make the policy decision in block 908 based on this consideration (i.e., based on the costs associated with the use of components in the physical resources layer 120 to implement the virtualized network functions for providing the service).

In some embodiments, the CALM component may make policy decisions based on previously received triggers and/or relating to an internal aspect of the VNF. For example, the system may license a subscription profile repository (SPR) based upon the number of subscribers for which it stores information. Typically the management and orchestration (MANO) component 102 would not have visibility of this "internal" information. However, if the vendor has set an internal (to the VNF) trigger definition to report this information to CALM component, then the CALM processor could use this information as part of the policy decision in block 908.

The above example (i.e., making a policy decision based on an internal aspect of the VNF) may be particularly useful in scenarios where there is not a strong correlation between application level utilization and virtualized infrastructure layer level resource utilization. For example, some types of Gx transactions require significantly fewer resources to process than other types of Gx transactions that can occur within the same session. Thus a PCRF may process a very high number of Gx transactions per second, but these transactions may not require significant infrastructure resources. However, due to the nature of the Gx protocol, it is possible that the same PCRF could rapidly be required to process a lower number of Gx transactions per second, but these fewer Gx transactions could require more infrastructure resources. Therefore, the CALM component could make a policy decision to not allow a PCRF VNF component to scale down regardless of its resource usage if it is processing more Gx transactions per second than a defined threshold. Other factors relating to Gx and Gy type events that could be used to make policy decisions based on internal aspects of the VNF components include: the number of unique subscriber sessions within a PCRF VNF that are active each day; the number of rules in a PCRF VNF; and the number of rate plans in an online charging system. The CALM component could track any or all of these components, features or factors. The CALM component may also use such information for licensing or charging purposes.

In some embodiments, the CALM component may use predictive analytics to make the policy decisions in block 908. That is, using conventional non-predictive techniques, real-time metrics and measurements taken in MANO component 102 are used in a reactive way, by which time a capacity problem may have occurred. In contrast to these conventional techniques, some of the embodiments discussed in this application include a predictive system that uses events/information from outside of the telecommunication system to predict (e.g., using machine learning) events before they occur. The CALM component could use such information to alter, modify or override the decisions or recommendations of the conventional systems. For example, it may advantageous in scenarios where the (conventional) real-time metrics indicate that a service can be scaled down or remain constant, for the CALM component to utilize the predictive system in order to determine whether the service should actually be scaled up (e.g., due to external factors, such as American Idol final starting in 30 minutes, a football game starting in 30 minutes, etc.). Similarly, the non-predictive system may determine that the network should be scaled up due to an increased measured demand, but the predictive system may indicate that the increase in demand is temporary and will be over even before the system can complete the scaling up operations (i.e., the increased demand is likely to be a spike).

In some embodiments, the CALM component may make policy decisions relating to power consumption by resources in the physical resources layer 120 in block 908. For example, the CALM processor may determine whether an incremental scaling down operation will result in an actual or significant reduction in power consumption, and make a policy decision in block 908 to not allow an incremental scaling down operation to occur when it determines that the incremental scaling down will not reduce the power consumption. As another example, the CALM processor may make a policy decision to not scale down a service in order to save power because a higher level of redundancy is needed and/or because the benefits associated with scaling down (e.g., power savings, etc.) do not exceed the risks or costs associated with those operations.

In some embodiments, the CALM component may make policy decisions relating to carbon emissions in block 908. For example, the operator may be required to reduce or offset its carbon footprint (or require that the VNF vendor offsets the carbon footprint), and it may not have sufficient carbon credits available to offset the footprint. As such, in block 908, the CALM processor may make policy decisions that scale down the system (e.g., at the expense of performance, etc.) in order to reduce the amount of power consumed by the components in the system by an amount that is commensurate with a carbon emission footprint offset.

In some embodiments, the CALM component may make policy decisions relating to data privacy and/or sovereignty in block 908. For example, the CALM component may determine whether a VNF component that processes data for a citizen of the European Union (EU) may be instantiated in a virtualized services layer 108 located in a non-EU country.

In some embodiments, the CALM component may make policy decisions based upon evaluating the cost of increasing a service versus the cost of penalties for breaching a service level agreement (SLA) if the service is not increased.

In some embodiments, the CALM component may make a policy decision by performing operations that include querying a license server. This may be to determine what the license allows (e.g., check if it is within licensing limits), and also to update or adjust the license (e.g., decrement the number of available licenses). The query may be internal or external to CALM component.

In some embodiments, the CALM component may make a policy decision in block 908 based upon using a common service key contained within the received request (e.g., for subsequent lifecycle events, etc.). Generally, all of the requests received by the CALM component (with the possible exception of the first one) could contain a common service key. The CALM processor may be configured to use this common service key to determine the current state (e.g., licensing, charging) state of a service and/or components (e.g., a VNF component such as PCRF VNF, etc.).

As a further example, a service lifecycle event may warrant or demand the scaling out of a service, but one of its constituent VNF components may currently be operating at its licensed capacity. The CALM processor could be configured to query a licensing server using the common service key in order to retrieve information that indicates that the VNF component is operating at its licensed capacity. The CALM processor could be configured to use the top-level part (or common/shared part) of the key when the licensing/charging decision relates to the service as a whole. The CALM processor could be configured to use the unique sub-level parts of the key when the licensing/charging decision relates to a component of the service (e.g., a VNF component).

In determination block 909, the CALM processor may determine whether the results of the policy decision made in block 908 are negative. In response to determining that the results of the policy decision made in block 908 are negative (i.e., determination block 909="Yes"), in block 911, the CALM processor may generate and send a "negative response" to the orchestrator component. In response to determining that the results are not negative (i.e., determination block 909="No"), in block 910 the CALM processor may determine or identify one or more triggers that should to be set (e.g., based on the policy decision made in block 908, etc.).

The triggers in block 910 may relate to any of the components in any of the layers discussed above with reference to FIGS. 1 and 8. For example, one set of triggers for a VNF component may be set if it was previously determined that the service should use online charging. A different set of triggers may be set for the same VNF if it was determined that the service should be charged for on an offline basis. The above-mentioned scenario (online vs offline) may occur when, for example, a network operator creates a vehicle tracking IoT type of service that requires an offline charging system (OFCS) VNF. The network operator may create one instance of the service (IoT type service) in a network slice for a reputable vehicle manufacturer using an offline charging model, and another instance of this service (IoT type service) in a network slice for a startup vehicle manufacturer using an online charging model (e.g., until the credit worthiness of the startup vehicle manufacturer has been established, etc.).

In an embodiment, one or more of the triggers may relate to the SDN controller (e.g., create virtual network, modify virtual network, remove virtual network, etc.). In an embodiment, one or more of the triggers may relate to the SDN resources (e.g., forwarding rule added, forwarding rule modified, forwarding rule removed, etc.).

In some embodiments, one or more of the triggers may be VNF manager triggers that relate to VNF Instantiation, Start, VNF Scaling (In/Out and Up/Down), or VNF Instance Termination.

In some embodiments, one or more of the triggers may be virtualized infrastructure manager triggers that relate to allocating a virtual machine, updating virtual machine resources, or terminating a virtual machine.

In some embodiments, one or more of the triggers may be virtual machine resource triggers that relate to computing, storage, or network.

Also in block 910, the CALM processor may generate trigger definitions for the determined triggers. Each trigger definition may include information that identifies or defines a trigger event that causes the trigger to be fired, a payload or contents of the trigger event (e.g., a common service key, etc.), information that identifies a destination component to which the payload/content is to be sent, and type information.

As mentioned above, a trigger definition may contain the identity of the destination node to which the trigger events should be sent. For example, the trigger definition may identify an online charging node or an offline charging node as the destination node. The trigger definition may also identify a particular online charging node amongst many online charging nodes (e.g., amongst online charging nodes associated with IoT, corporate customers, or retail subscribers). The online charging node may be included or accessible via the CALM component or the OSS/BSS component.

In some embodiments, the CALM component may also associate an action with each of the trigger definitions, and the trigger definitions and the associated actions may be sent to the destination nodes identified in the trigger definitions as the components/nodes to which the triggers should be sent. For example, a trigger event that causes one trigger to be sent may be required by the CALM component for monitoring (and policy) purposes, whereas another trigger event that causes another trigger to be sent may be required by the CALM component for charging purposes. The CALM component may identify and set these triggers accordingly. Other possible non-charging purposes for setting triggers may include fault monitoring, alarms, service assurance, etc. These triggers may be used to provide the charging node with rating information.

In optional block 912, the CALM processor may generate or select a unique common service key for use by the triggers, and include the common service key in the trigger definition. The CALM processor may generate the common service key when there is no existing common service key (e.g., when a service lifecycle event, such as a definition event or service instantiation event, is received). After an initial lifecycle event, all subsequent service lifecycle events should contain a previously set or previously generated common service key. As such, in some embodiments, the common service key may be sent from the NFV Orchestrator as part of the request received in block 906. In some embodiments, the common service key may be used by (or sent from) a VNF component as part of a trigger. In some embodiments, the CALM processor may be configured to generate the common service key and/or assemble its sub-level or constituent parts based on the information it receives from the NFV Orchestrator and/or other network components (e.g., VNF, etc.).

The common service key may be hierarchical in nature such that all virtual network functions (VNFs) and virtual machines (VMs) associated with a single service share a top-level part of the key, but each VNF and its associated VMs will also share a unique sub-level part of the key. The common service key may be used within the VNFs, and thus the triggers could come from within VNFs.

A hierarchical common service key may allow charges associated with a service to be broken down based upon the constituent VNFs incurring the charges and/or allow for triggers to be received from within individual VNF components.

In block 914, the CALM processor may generate a policy response message that includes the determined triggers or generated trigger definitions, which may include the common service key. In block 916, the CALM processor may send the generated policy response message to the NFV orchestrator component.

In block 918, the NFV orchestrator processor may receive the policy response message. In block 920, the NFV orchestrator processor may extract triggers or trigger definitions from the received message. In block 922, the NFV orchestrator processor may set local triggers (if any) in the orchestrator. In block 924, the NFV orchestrator processor may set remote triggers, which may be accomplished by sending messages to the relevant components in the network. For example, the NFV orchestrator processor may set a trigger in a VNF component associated with the specific service associated with the lifecycle event in step 902.

With reference to FIG. 10, in block 1001, a processor in a network component (e.g., NFV orchestrator, VNF manager, VNF component, etc.) may receive a trigger definition. In block 1002, the processor may use the information included in the received trigger definition to set a trigger. In block 1004, the processor may monitor any of a variety of resources and/or conditions to detect a trigger event. In determination block 1006, the processor may determine whether a trigger event has been detected (based on the monitoring).

In response to determining that trigger event has not yet occurred (i.e., determination block 1006="No"), the processor may resume monitoring the resources/conditions in block 1004. In response to detecting a trigger event (i.e., determination block 1006="Yes"), the processor may generate and send a trigger to the destination component (identified in the trigger definition) in block 1008. The trigger may be a communication signal or message that includes information suitable for causing a receiving device or component to initiate an action or perform an operation in response to receiving the communication signal/message.

Figure 11:
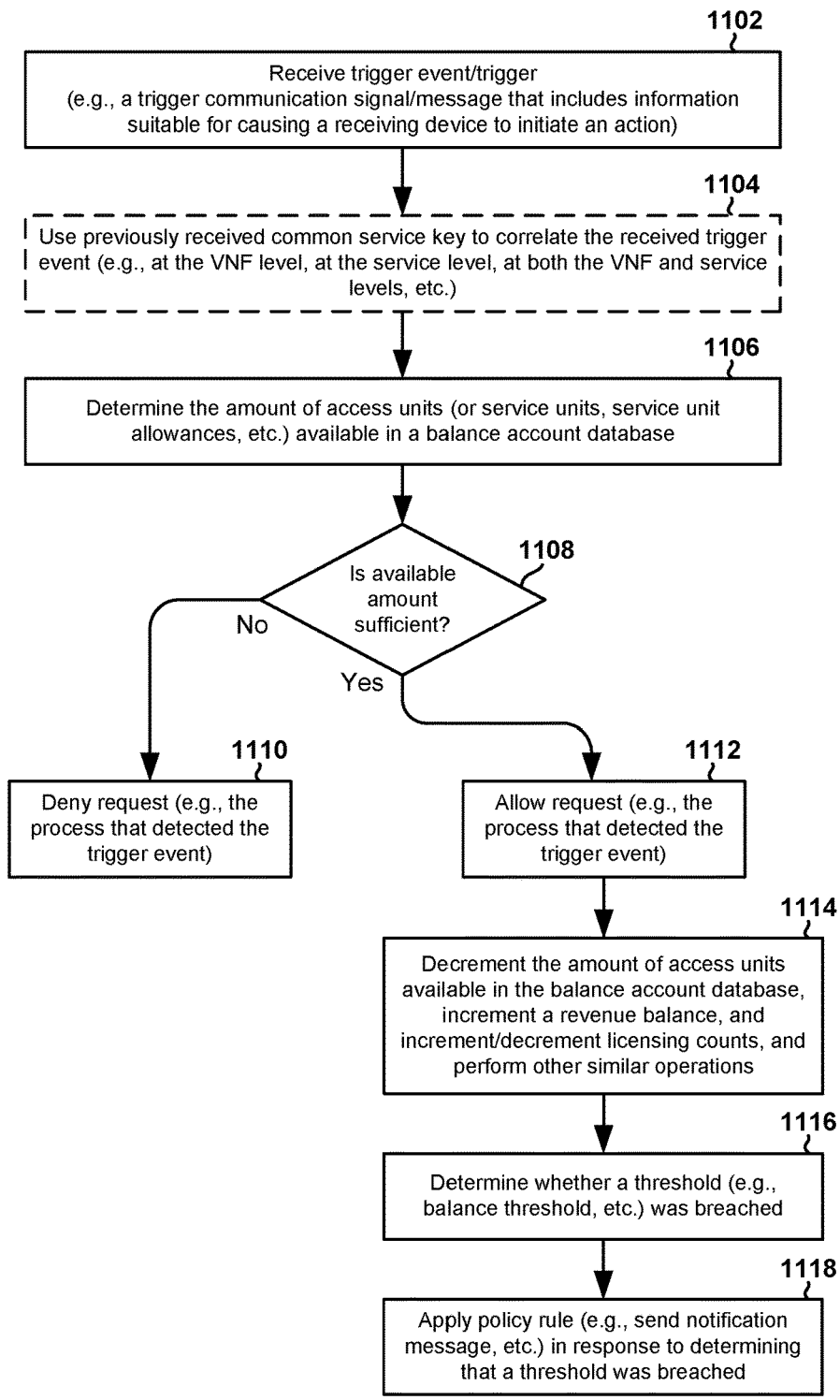

With reference to FIG. 11, in block 1102, the CALM processor, the orchestrator processor, or a processor in any destination component identified in the trigger definition (e.g., an online charging component accessible via the OSS/BSS, etc.) may receive one or more triggers (or the trigger communication signals/messages). The trigger(s) may be sent as part of the operations in block 1008 of FIG. 10. The trigger(s) may be received in block 1102 from any or all of the NFV orchestrator, VNF manager, VIM, SDN controller or SDN resource. The trigger may be used for performing charging operations, making charging-related decisions, making policy decisions, making licensing decision, etc.

In optional block 1104, the processor (e.g., CALM processor, etc.) may use a hierarchical common service key to correlate the received trigger at the VNF level, at the service level, or at both the VNF and service levels. For example, in optional block 1104, the CALM component (e.g., online charging component 806, etc.) may use the common service key received in block 1102 to correlate the received trigger with other triggers from any other trigger functions 820 (e.g., received in a separate instance of block 1102, potentially from a different trigger function) and/or with existing state information that was modified as part of block 908. In the latter case (correlating the received trigger with existing state information), the common service key could have been received in block 906 or generated in block 912. In some embodiments, if the trigger is determined to be a non-blocking trigger, the operations of method 900 would terminate after block 1104.

In block 1106, the processor may access an account balance (e.g., a balance account database in an online charging system) that identifies the quantity of access units or service unit allowances that are available for allocation for a customer or component, and determine the amount of access units available. A service unit allowance may be a service or access unit that may be allocated to a customer and used to determine the amount of services that are to be provided to that customer, such as the number of instances of policy VNF components (e.g., PCRF VNF) that may be instantiated for a service requested by a client.

As another example, the balance may be associated with a VNF vendor or a VNF broker, and it may relate to the number of remaining VNF instances that the operator is allowed to create or the total number of VNF instances that the operator is allowed to operate concurrently. In this scenario, if the service lifecycle event related to terminating a VNF, then the number of remaining VNF instances that the operator is allowed to create would increment, or the number of VNF instances that the operator is operating concurrently would decrement. In some embodiments, the processor may accomplish the above mentioned operations by obtaining a license in the form of a lock from the licensing manager. Upon the termination of the VNF, the processor may return the lock to the licensing manager.

In some embodiments, as part of the operations in block 1106, the processor may check the amount of access units available in a balance account database, check the amount of access units available in a vendor balance account database, check a revenue balance, and check a licensing count, and perform other similar operations.

In determination block 1108, the processor may determine whether the amount of access units available in the balance account database is sufficient. For example, the processor may determine whether a pre-determined amount of access units may be decremented from the remaining balance without exceeding a (zero-balance) threshold.

In response to determining that there is not a sufficient amount of access units available (i.e., determination block 1108="No"), in block 1110 the processor may perform various operations to deny or prevent a process, task or procedure that caused the trigger event (e.g., process in the trigger function that detected the trigger event) from performing or completing an operation associated with the trigger event (e.g., the operation of instantiating a VNF component may be associated with the trigger event of attempting to instantiate a VNF component, etc.). In some embodiments, this may be accomplished via the processor generating and sending a notification message, requesting more funds, etc. In response to determining that there is a sufficient amount of access units available (i.e., determination block 1108="Yes"), in block 1112 the processor may perform various operations to allow the process, task or procedure to perform the requested operation. Alternatively or in addition, in block 1112, the processor may generate and send a trigger response message. In some embodiments, the trigger response (or a copy or duplicate of the trigger response) may be sent to a downstream system such as a mediation system for revenue assurance and/or audit. The trigger response message may report the trigger event and a subsequent response action. In some embodiments, the trigger response may include any or all of the features and information associated with a "Charge Detail Record" (CDR).

In block 1114, the processor may decrement the amount of access units available in the balance account database, increment a revenue balance, increment/decrement licensing counts, and perform other similar operations. In block 1116, the processor may determine whether a threshold was breached (e.g., as a result of decrement the available access units, etc.). The threshold may relate to charging (e.g., a balance), policy, or licensing aspects. The processor may use the threshold for real-time monitoring of resources/events. Certain resources (service, VNF, or infrastructure) that breach a threshold may require that a policy component trigger a lifecycle event with the orchestrator component. In block 1118, the processor may apply a policy rule (e.g., generate and send a notification message, etc.) in response to determining that a threshold was breached.

Figure 12:
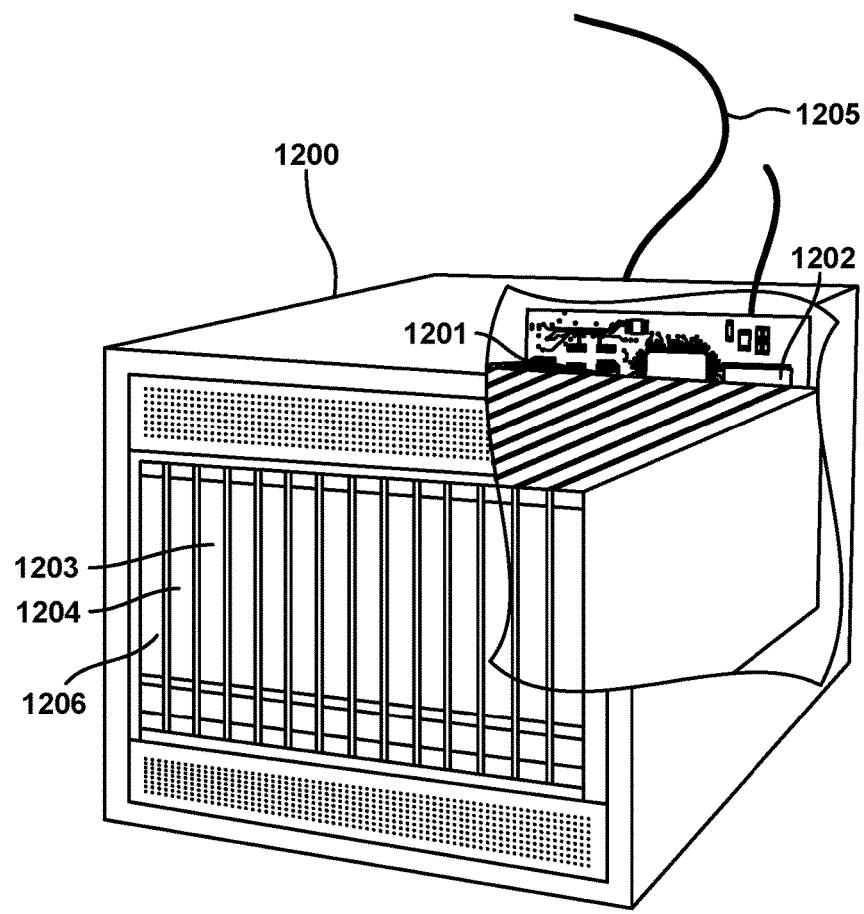
FIG. 12 is a component block diagram of server computing device suitable for implementing various embodiments.

The various embodiments may be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1203. The server 1200 may also include a floppy disc drive, compact disc (CD) or DVD disc drive 1206 coupled to the processor 1201. The server 1200 may also include network access ports 1204 coupled to the processor 1201 for establishing data connections with a network 1205, such as a local area network coupled to other operator network computers and servers.

The processor 1201 may be any programmable microprocessor, microcomputer or multiple processor chip or chips that can be configured by software instructions (applications) to perform a variety of functions, including the functions of the various embodiments described below. Multiple processors 1201 may be provided, such as one processor dedicated to wireless communication functions and one processor dedicated to running other applications. Typically, software applications may be stored in the internal memory 1202, 1203 before they are accessed and loaded into the processor 1201. The processor 1201 may include internal memory sufficient to store the application software instructions.

Generally, a process may be a software representation of an application program in a computing device. A process may be a heavy-weight process that includes multiple light-weight processes or threads, which are processes that share all or portions of their context (e.g., address space, stack, permissions and/or access restrictions, etc.) with other processes/threads. A task may include any procedure, unit of work, or sequence of operations that may be executed in a processing unit via a thread or process running on a processor.

As used in this application, the terms "component," "module," "system," "engine," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). Each of these technologies involves, for example, the transmission and reception of signaling and content messages. It should be understood that any references to terminology and/or technical details related to an individual standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of applying service-level controls in a telecommunication system that implements network function virtualization (NFV), the method comprising:
   receiving, in a processor of a server computing device, a policy request message relating to a network service lifecycle event from an orchestrator component that is deployed in the telecommunication system;
   using information included in the received policy request message to make a service-level policy decision;
   generating a unique common service key, wherein:
      the unique common service key is a hierarchical key that includes a top-level portion and at least one sub-level portion;
      the value of the top-level portion identifies all virtualized network functions (VNFs) and their associated virtual machines (VMs) that are associated with the network service;
      the value of the at least one sub-level portion identifies a specific VNF and all of the VMs that are associated with that specific VNF;
   generating at least one trigger definition relating to the network service lifecycle event based on the policy decision, the at least one trigger definition including the generated unique common service key;
   generating a policy response message that includes the at least one trigger definition; and
   sending the generated policy response message to the orchestrator component.

2. The method of claim 1, further comprising:
receiving a trigger from a virtualized network function.

3. The method of claim 1, further comprising:
detecting, via an orchestrator processor of the orchestrator component, the network service lifecycle event;
generating, via the orchestrator processor, the policy request message in response to detecting the network service lifecycle event;
sending the generated policy request message to the server computing device;
receiving, in the orchestrator processor, the policy response message from the server computing device in response to sending the generated policy request message;
extracting the at least one trigger definition from the received policy response message; and
setting a trigger based on the information included in the extracted trigger definition.

4. The method of claim 3, wherein setting the trigger based on the information included in the extracted trigger definition comprises:
   setting a local trigger in the orchestrator component.

5. The method of claim 3, wherein setting the trigger based on the information included in the extracted trigger definition comprises:
   setting a remote trigger in one or more of:
      an instance of a virtualized network function (VNF) in a virtualized services layer of the telecommunication system;
      a VNF manger in a management and orchestration (MANO) layer of the telecommunication system;
      a virtualized infrastructure manager in the MANO layer of the telecommunication system;
      a software defined networking controller; and
      a software defined networking resource.

6. The method of claim 1, wherein using the information included in the received policy request message to make the service-level policy decision further comprises querying a licensing system.

7. The method of claim 1, wherein using the information included in the received policy request message to make the service-level policy decision comprises:
   determining a first value that identifies costs associated with increasing the network service;
   determining a second value that identifies costs associated with penalties of breaching a service licensing agreement; and
   making the service-level policy decision based on a result of comparing the first value to the second value.

8. The method of claim 1, further comprising:
receiving a trigger that was generated by a network component in response to the network component loading a procedure that causes a trigger event;
using a common service key to determine whether to allow the procedure to perform an operation associated with the trigger event;
generating a trigger response message that indicates whether to allow performance of the operation associated with the trigger event; and
sending the trigger response message to the network component.

9. A server computing device deployed in a telecommunication system that implements network function virtualization (NFV), comprising:
   a processor configured with processor-executable instructions to perform operations comprising:
      receiving a policy request message relating to a network service lifecycle event from an orchestrator component that is deployed in the telecommunication system;

using information included in the received policy request message to make a service-level policy decision;
generating a unique common service key, wherein:
the unique common service key is a hierarchical key that includes a top-level portion and at least one sub-level portion;
the value of the top-level portion identifies all virtualized network functions (VNFs) and their associated virtual machines (VMs) that are associated with the network service;
the value of the at least one sub-level portion identifies a specific VNF and all of the VMs that are associated with that specific VNF;
generating at least one trigger definition relating to the network service lifecycle event based on the policy decision, the at least one trigger definition including the generated unique common service key;
generating a policy response message that includes the at least one trigger definition; and
sending the generated policy response message to the orchestrator component.

10. The server computing device of claim 9, wherein the processor is configured with processor-executable instructions to perform operations further comprising:
receiving a trigger from a virtualized network function.

11. The server computing device of claim 9, wherein the processor is configured with processor-executable instructions to perform operations such that sending the generated policy response message to the orchestrator component causes the orchestrator component to set a remote trigger in one or more of:
an instance of a virtualized network function (VNF) in a virtualized services layer of the telecommunication system;
a VNF manger in a management and orchestration (MANO) layer of the telecommunication system;
a virtualized infrastructure manager in the MANO layer of the telecommunication system;
a software defined networking controller; and
a software defined networking resource.

12. The server computing device of claim 9, wherein the processor is configured with processor-executable instructions to perform operations further comprising:
receiving a trigger that was generated by a network component in response to the network component loading a procedure that causes a trigger event;
using a common service key to determine whether to allow the procedure to perform an operation associated with the trigger event;
generating a trigger response message that indicates whether to allow performance of the operation associated with the trigger event; and
sending the trigger response message to the network component.

13. A non-transitory computer readable storage medium having stored thereon processor-executable software instructions configured to cause a processor to in a server computing device that is deployed in a telecommunication system that implements network function virtualization (NFV) to perform operations comprising:
receiving a policy request message relating to a network service lifecycle event from an orchestrator component that is deployed in the telecommunication system;
using information included in the received policy request message to make a service-level policy decision;
generating a unique common service key, wherein:
the unique common service key is a hierarchical key that includes a top-level portion and at least one sub-level portion;
the value of the top-level portion identifies all virtualized network functions (VNFs) and their associated virtual machines (VMs) that are associated with the network service;
the value of the at least one sub-level portion identifies a specific VNF and all of the VMs that are associated with that specific VNF;
generating at least one trigger definition relating to the network service lifecycle event based on the policy decision, the at least one trigger definition including the generated unique common service key;
generating a policy response message that includes the at least one trigger definition; and
sending the generated policy response message to the orchestrator component.

14. The non-transitory computer readable storage medium of claim 13, wherein the stored processor-executable software instructions are configured to cause a processor to perform operations further comprising:
receiving a trigger from a virtualized network function.

15. The non-transitory computer readable storage medium of claim 13, wherein the stored processor-executable software instructions are configured to cause a processor to perform operations such that sending the generated policy response message to the orchestrator component causes the orchestrator component to set a remote trigger in one or more of:
an instance of a virtualized network function (VNF) in a virtualized services layer of the telecommunication system;
a VNF manger in a management and orchestration (MANO) layer of the telecommunication system;
a virtualized infrastructure manager in the MANO layer of the telecommunication system;
a software defined networking controller; and
a software defined networking resource.

16. The non-transitory computer readable storage medium of claim 13, wherein the stored processor-executable software instructions are configured to cause a processor to perform operations further comprising:
receiving a trigger that was generated by a network component in response to the network component loading a procedure that causes a trigger event;
using a common service key to determine whether to allow the procedure to perform an operation associated with the trigger event;
generating a trigger response message that indicates whether to allow performance of the operation associated with the trigger event; and
sending the trigger response message to the network component.

* * * * *